US011818646B2

(12) United States Patent
Aijaz

(10) Patent No.: US 11,818,646 B2
(45) Date of Patent: Nov. 14, 2023

(54) SYSTEM-LEVEL SCHEDULE GENERATION FOR INTEGRATED TSN AND 5G DEPLOYMENTS

(71) Applicant: Kabushiki Kaisha Toshiba, Tokyo (JP)

(72) Inventor: Adnan Aijaz, Bristol (GB)

(73) Assignee: Kabushiki Kaisha Toshiba, Tokyo (JP)

( * ) Notice: Subject to any disclaimer, the term of this patent is extended or adjusted under 35 U.S.C. 154(b) by 75 days.

(21) Appl. No.: 17/526,478

(22) Filed: Nov. 15, 2021

(65) Prior Publication Data

US 2023/0156559 A1 May 18, 2023

(51) Int. Cl.
*H04W 40/12* (2009.01)
*H04L 47/24* (2022.01)
*H04L 47/28* (2022.01)
*H04W 72/0446* (2023.01)

(52) U.S. Cl.
CPC .............. *H04W 40/12* (2013.01); *H04L 47/24* (2013.01); *H04L 47/28* (2013.01); *H04W 72/0446* (2013.01)

(58) Field of Classification Search
CPC .. H04W 40/12; H04W 72/0446; H04L 47/24; H04L 47/28
See application file for complete search history.

(56) References Cited

U.S. PATENT DOCUMENTS 10,511,455 B1 * 12/2019 Sharma ................... H04L 69/12
2018/0132234 A1 5/2018 Cavalcanti et al.
2018/0184438 A1 * 6/2018 Cavalcanti ............ H04W 74/04
2018/0309656 A1 * 10/2018 Regev .................... H04L 43/045
2020/0259896 A1 * 8/2020 Sachs ..................... H04L 67/10
2021/0250787 A1 * 8/2021 Kolding ................. H04L 47/24

(Continued)

FOREIGN PATENT DOCUMENTS

| CN | 112511462 A | * | 3/2021 | ......... H04L 47/2433 |
| CN | 113498106 A | * | 10/2021 | |
| JP | 2009-065429 A | | 3/2009 | |

OTHER PUBLICATIONS

CN_112511462_A_Xu English translation (Year: 2021).*

(Continued)

*Primary Examiner* — Chi H Pham
*Assistant Examiner* — Weibin Huang
(74) *Attorney, Agent, or Firm* — Oblon, McClelland, Maier & Neustadt, L.L.P.

(57) ABSTRACT

A method of scheduling and transmitting frames of a first data stream in a composite network is provided. The method includes: determining, for the composite network, an allocation window based on a cycle time of the first data stream; determining a number of cycles for the first data stream based on the allocation window and the cycle time of the first data stream in the composite network; determining a number of frame transmissions for each cycle of the first data stream based on a payload of the first data stream and a maximum transmission unit of the composite network; scheduling the frame transmissions for each cycle of the first data stream sequentially on each link along the route and within the allocation window; and for each link, allocating a time-sensitive network slot or a wireless 5G window for each frame transmission based on a type of the link.

16 Claims, 18 Drawing Sheets

(56) References Cited

U.S. PATENT DOCUMENTS

| | | | |
|---|---|---|---|
| 2021/0306910 A1 | 9/2021 | Guo et al. | |
| 2022/0046462 A1* | 2/2022 | De Andrade Jardim | ................... H04W 28/02 |
| 2022/0061063 A1* | 2/2022 | Patel | ................... H04W 56/001 |
| 2022/0191144 A1* | 6/2022 | Terstrup | ................ H04L 47/625 |
| 2022/0386323 A1* | 12/2022 | Ginthoer | ............. H04W 72/543 |

OTHER PUBLICATIONS

CN_113498106_A_Tang English Translation (Year: 2021).*

Aijaz, et al. "The Tactile Internet for Industries: A Review" Proceedings of the IEEE, vol. 107, No. 2, Feb. 2019, 22 pages.

Aijaz, "Private 5G: The Future of Industrial Wireless" IEEE Industrial Electronics Magazine, vol. 14, No. 4, Dec. 2020, 10 pages.

U.S. Appl. No. 17/130,573, filed Dec. 22, 2020, Aijaz.

Office Action dated Jul. 11, 2023, in Japanese Patent Application No. 2022-136085, w/English-langauge Translation.

Sophia Antipolis, "Integration of the 5G System in a TSN Network", SA WG2 Meeting #128-Bis, Aug. 20-24, 2018, Nokia Shanghai Bell, pp. 2-9.

\* cited by examiner

SYSTEM-LEVEL SCHEDULE GENERATION FOR INTEGRATED TSN AND 5G DEPLOYMENTS

FIELD

Embodiments described herein relate generally to a method of scheduling data transfer in communication systems.

BACKGROUND

Time-sensitive networking (TSN) is a set of standards under development within the IEEE 802.1 working group to improve the real-time capabilities of standard Ethernet. TSN provides guaranteed data delivery with deterministic and bounded latency and extremely low data loss. TSN supports both time-critical and best-effort traffic over a single standard Ethernet network. TSN is expected to be the de-facto wired technology for industrial communication. It is likely to co-exist with high-performance wireless technologies like 5G. Therefore, integration of TSN and 5G is crucial in the envisioned digital transformation of industrial systems. Such integration provides end-to-end deterministic connectivity leading to various design simplifications in industrial automation networks while enabling unprecedented new applications. However, such integration and converged operation of TSN and high-performance wireless also creates various challenges.

Arrangements of the present invention will be understood and appreciated more fully from the following detailed description, made by way of example only and taken in conjunction with drawings in which.

Figure 13:
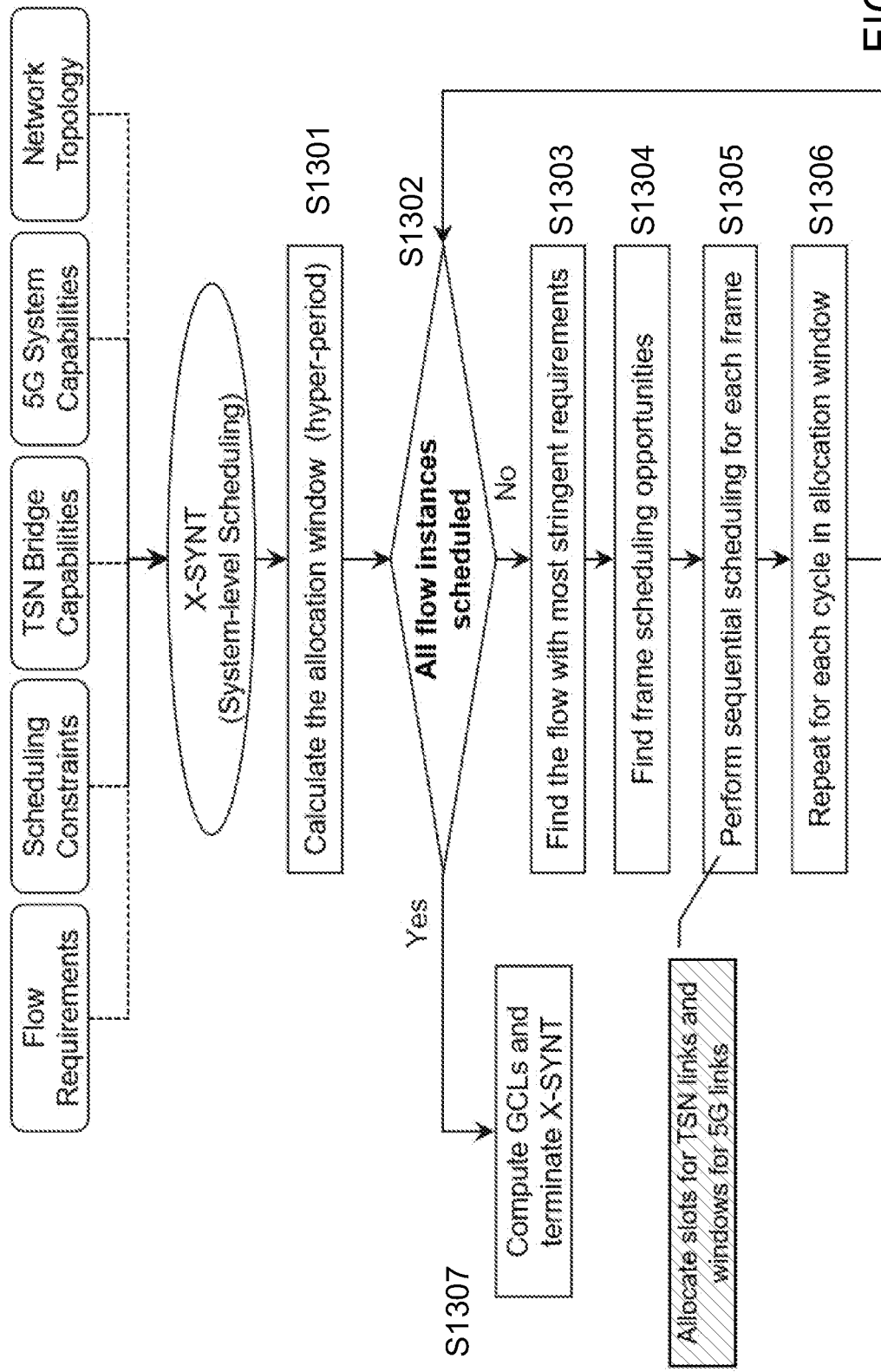
Figure 14:
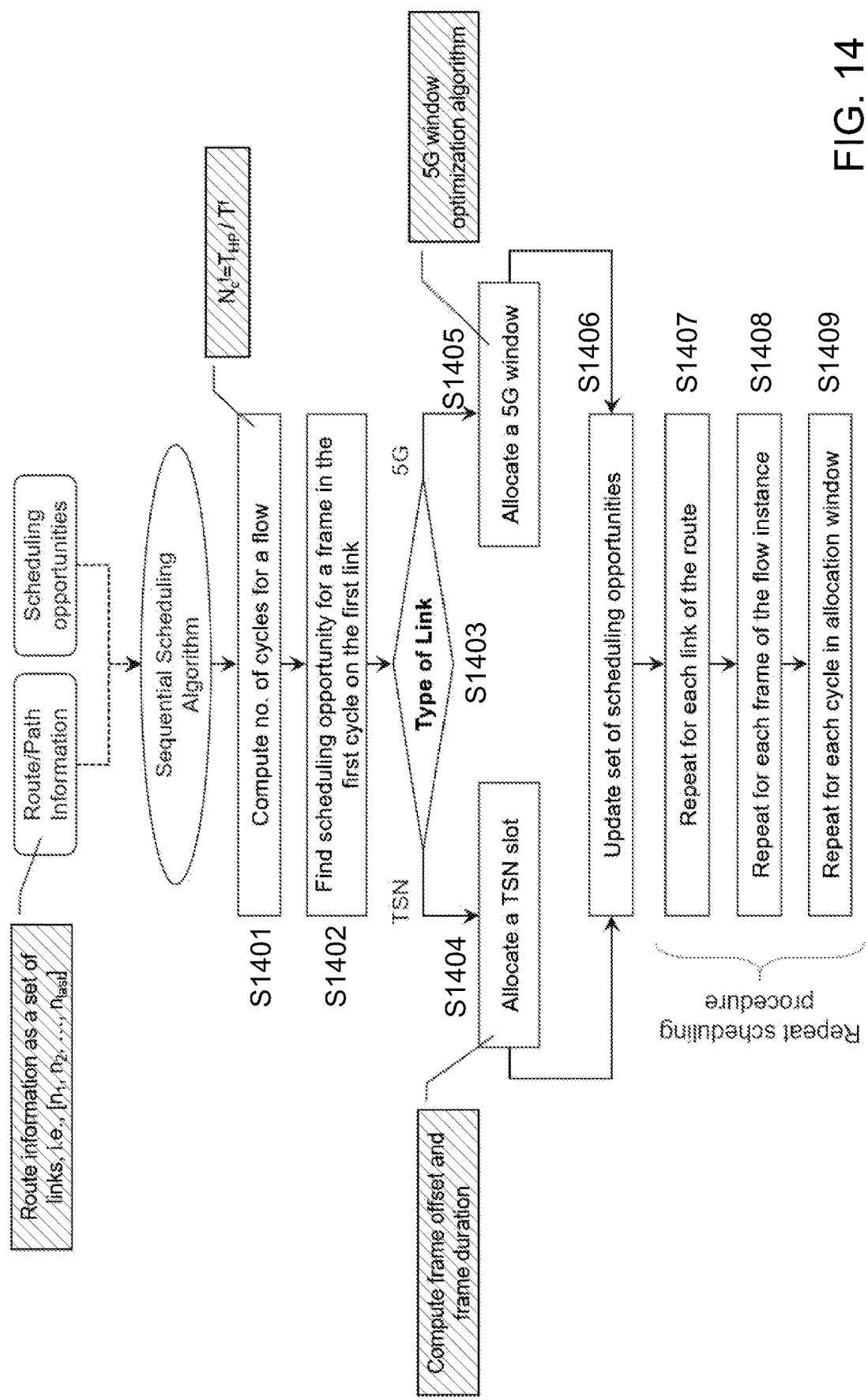
Figure 15:
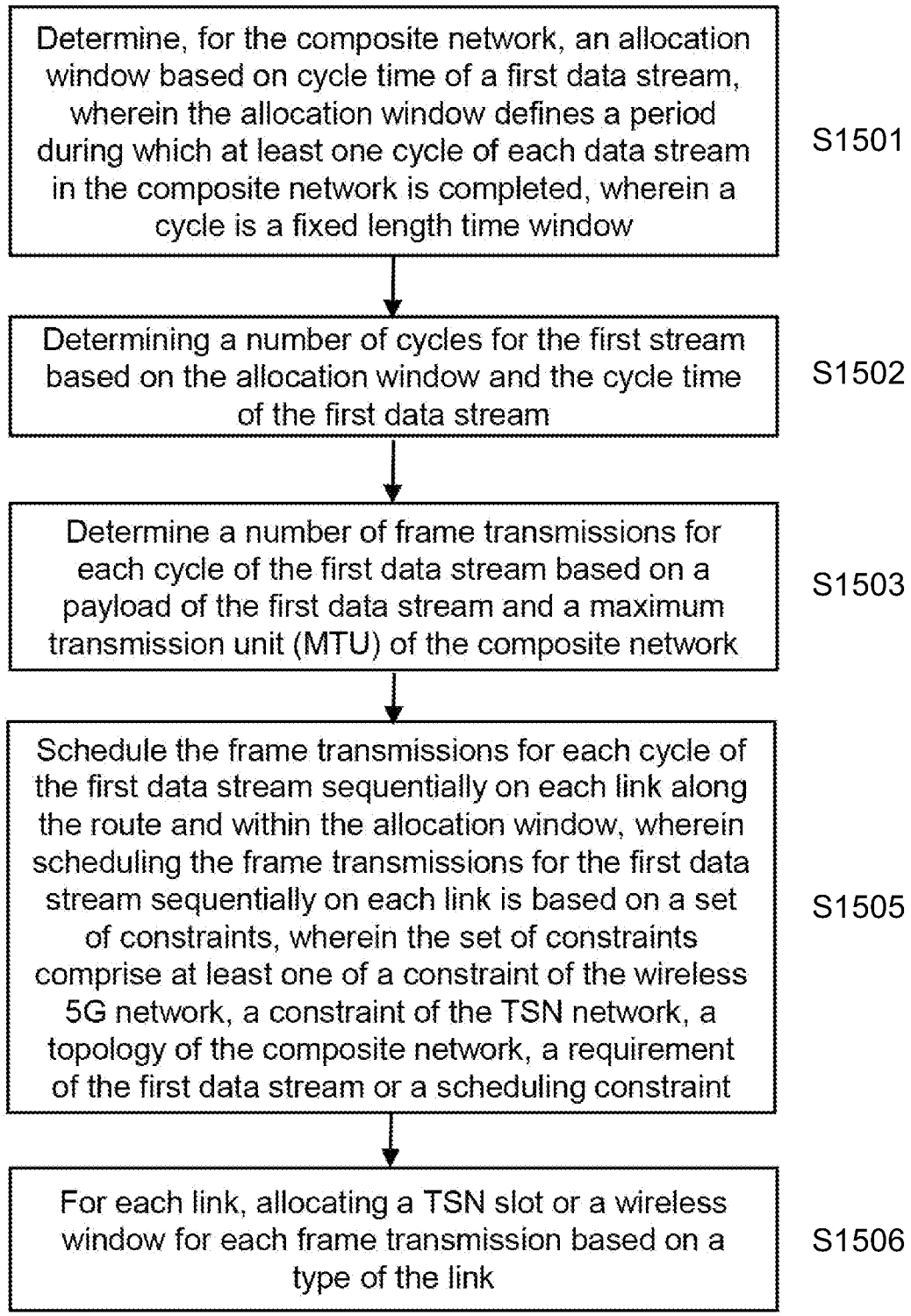
Figure 16:
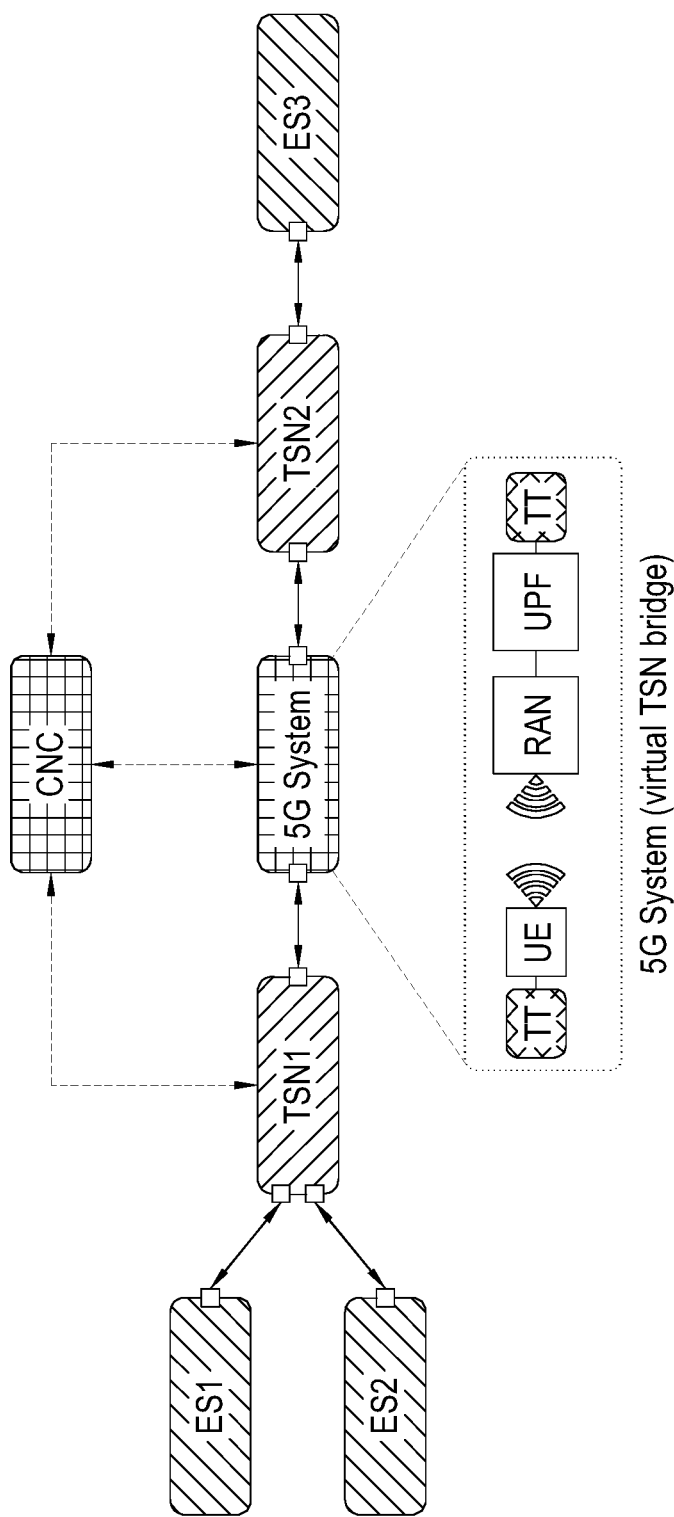
Figure 17:
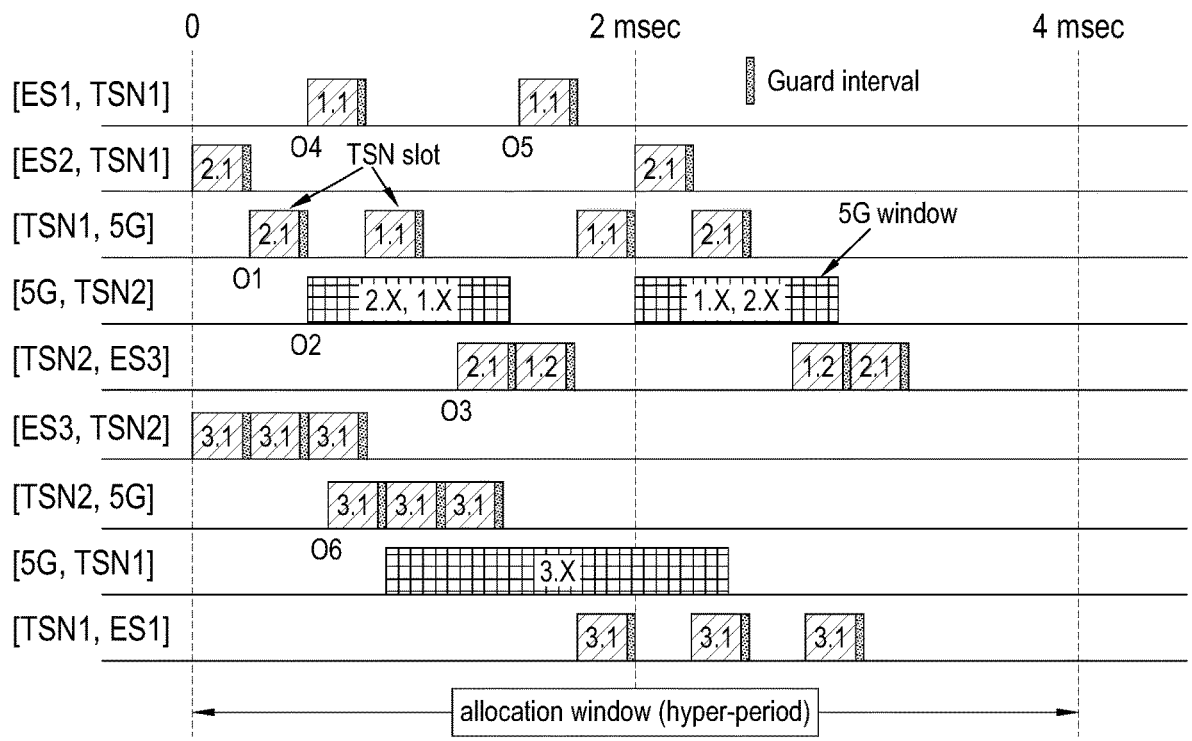
Figure 18:
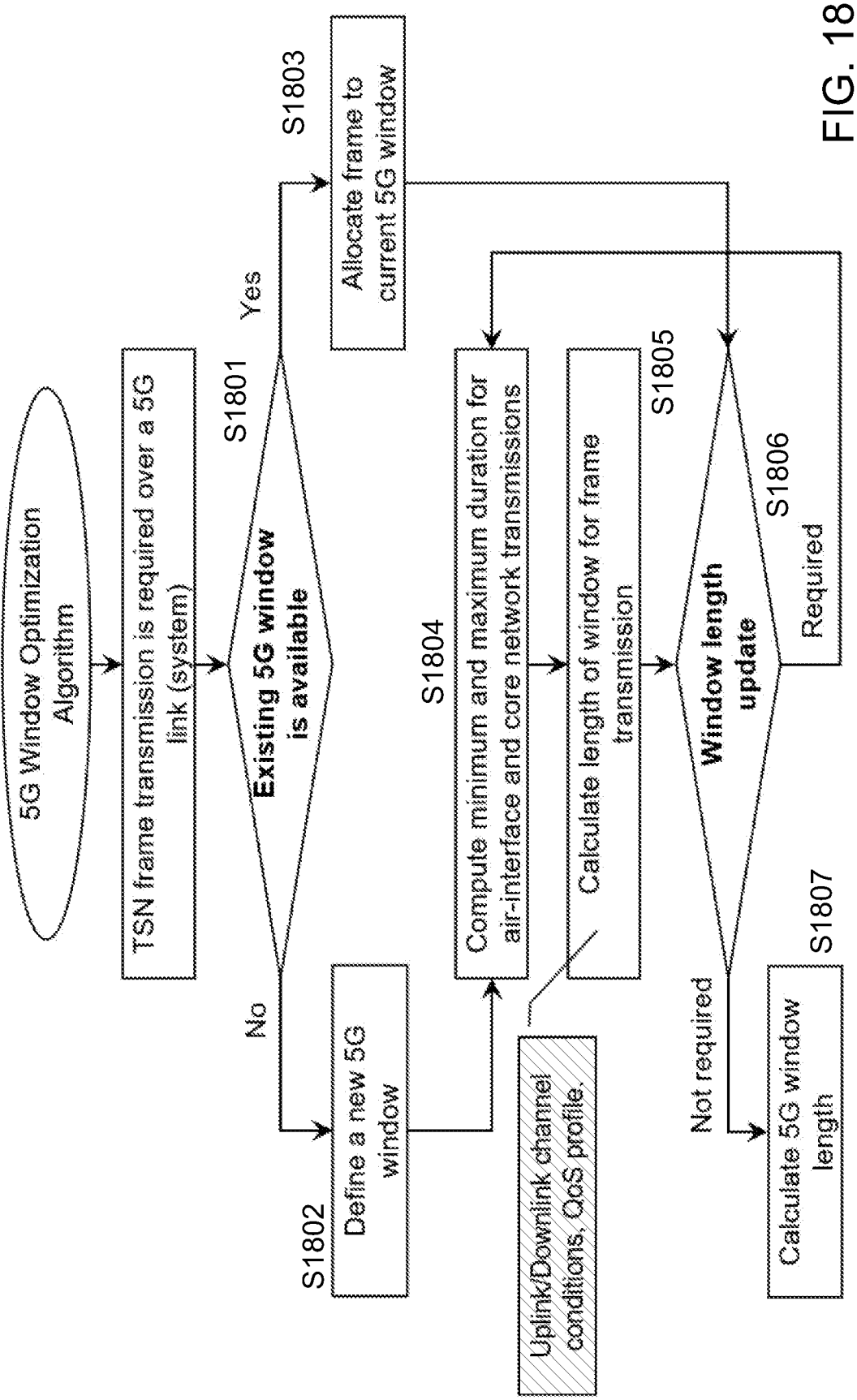
Figure 19:
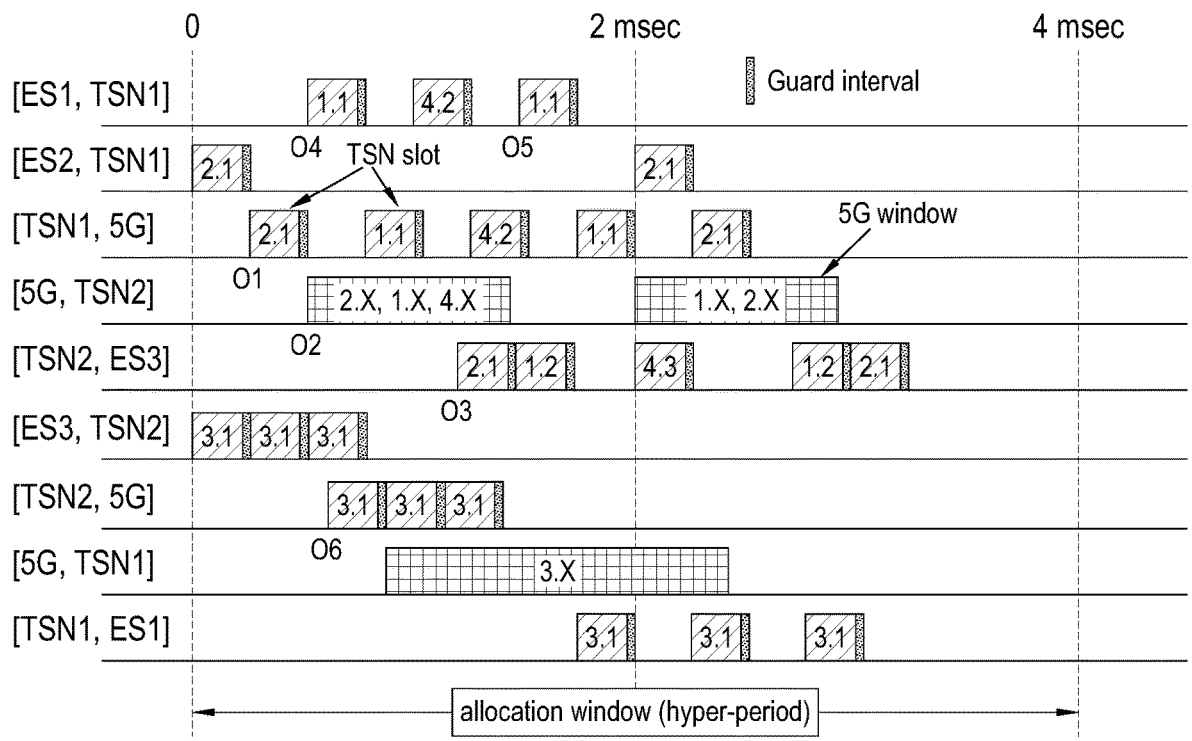

FIG. 13 outlines a method for system-level scheduling according to an embodiment;

FIG. 14 outlines a method of scheduling frame transmissions according to an embodiment;

FIG. 15 outlines a method of scheduling frame transmissions according to an embodiment;

FIG. 16 illustrates an example system model;

FIG. 17 illustrates schedule generation for the system model of FIG. 16;

FIG. 18 outlines a method of wireless window optimisation according to an embodiment; and FIG. 19 outlines schedule generation for best-effort traffic.

DETAILED DESCRIPTION

According to a first aspect of the invention there is provided a method of scheduling and transmitting frames of a first data stream in a composite network, wherein the composite network comprises a plurality of nodes, the nodes comprising at least one time-sensitive network (TSN) comprising at least one time-sensitive network (TSN) bridge, and at least one wireless 5G network comprising an air interface and a core network, the first data stream associated with a route from a first node of the plurality of nodes to a second node of the plurality of nodes, the route comprising at least one link, the link being either a wireless 5G link or a TSN link, the method comprising: determining, for the composite network, an allocation window based on a cycle time of the first data stream, wherein the allocation window defines a period during which at least one cycle of each data stream in the composite network is completed, wherein a cycle is a fixed length time window; determining a number of cycles for the first data stream based on the allocation window and the cycle time of the first data stream in the composite network; determining a number of frame transmissions for each cycle of the first data stream based on a payload of the first data stream and a maximum transmission unit (MTU) of the composite network; scheduling the frame transmissions for each cycle of the first data stream sequentially on each link along the route and within the allocation window; and for each link, allocating a TSN slot or a wireless 5G window for each frame transmission based on a type of the link, wherein scheduling the frame transmissions for the first data stream sequentially on each link is based on a set of constraints, wherein the set of constraints comprise at least one of a constraint of the wireless 5G network, a constraint of the TSN network, a topology of the composite network, a requirement of the first data stream or a scheduling constraint.

A TSN link connects a sender TSN bridge to either a TSN bridge or a 5G system as receiver. Similarly, a 5G link connects a sender 5G system to either another 5G system or a TSN bridge as receiver.

The method jointly provides an optimal schedule through joint optimization of wireless 5G and TSN systems. The method ensures that the wireless 5G and TSN systems are jointly optimized for traffic flows while considering system-level, 5G-centric, and TSN-centric constraints.

In an embodiment, scheduling the frame transmissions for the first data stream sequentially on each link comprises: wherein the link is a TSN link, for each frame transmission, determining an earliest available frame offset on the link which fulfils a set of constraints, wherein the set of constraints comprise a constraint of the wireless 5G network, a constraint of the TSN network, a topology of the composite network, a requirement of the first data stream and/or a scheduling constraint; and scheduling the frame transmission on the link at the earliest available frame offset.

This ensures that the wireless 5G and TSN systems are jointly optimized for traffic flows while considering system-level, 5G-centric, and TSN-centric constraints.

In an embodiment, determining the allocation window comprises: determining the allocation window based on the cycle time of the first data stream and a cycle time of a second data stream, wherein frames of the second data stream are to be transmitted over the composite network.

This feature enables scheduling of multiple data streams.

In an embodiment, the route comprises a TSN link, the method further comprising: creating a gate control list for controlling the transmission of the frame transmissions on the TSN link based on the scheduling of the frame transmissions for each cycle of the first data stream.

This feature enables the control of data streams by permitting/restricting frame transmission through a timed gate for each queue in the TSN bridge.

In an embodiment, frames of a second data stream are to be transmitted over the composite network, the method further comprising: prioritising the first data stream based on the cycle time of the first data stream and a cycle time of the second data stream.

This feature ensures that data streams with tighter cycle time requirements are given priority.

In an embodiment, scheduling the frame transmissions for the first data stream sequentially on each link comprises: for each frame transmission on a link of the route, wherein the link is a TSN link, wherein the frame transmission is the first transmission of the first data stream to be scheduled on the link, schedule the frame transmission based on a number of available slots on the link, a link transmission constraint and a frame isolation constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge.

This feature ensures that the wireless 5G and TSN systems are jointly optimized for traffic flows while considering system-level, 5G-centric, and TSN-centric constraints.

In an embodiment, scheduling the frame transmissions for the first data stream sequentially on each link comprises: for each frame transmission on a link of the route, wherein the link is a TSN link, wherein the frame transmission is not the first transmission of the first data stream to be scheduled on the link, schedule the frame transmission based on a number of available slots on the link, a frame isolation constraint, a frame transmission order constraint, and a link transmission constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge, wherein the frame transmission order constraint specifies that each frame in the network can only be transmitted over a link after it has been completely received over a link directly previous.

This feature ensures that the wireless 5G and TSN systems are jointly optimized for traffic flows while considering system-level, 5G-centric, and TSN-centric constraints.

In an embodiment, scheduling the frame transmissions for the first data stream sequentially on each link comprises: for each frame transmission on a link of the route, wherein the link is a TSN link immediately following a 5G link, wherein the TSN link is from a TSN network that receives frames from a 5G network, schedule the frame transmission based on the number of available slots on the link, an end-to-end transmission time of a frame over the 5G system, the frame isolation constraint, the frame transmission order constraint, and the link transmission constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge, wherein the frame transmission order constraint specifies that each frame in the network can only be transmitted over a link after it has been completely received over a link directly previous.

This feature ensures that the wireless 5G and TSN systems are jointly optimized for traffic flows while considering system-level, 5G-centric, and TSN-centric constraints.

In an embodiment, scheduling the frame transmissions for the first data stream sequentially on each link comprises: for each frame transmission on a link of the route, wherein the link is a wireless 5G link, schedule the frame transmission based on a frame transmission order constraint and a radio resource allocation constraint, wherein the frame transmission order constraint specifies that each frame in the network can only be transmitted over a link after it has been completely received over a link directly previous, wherein the radio resource allocation constraint specifies that the frame transmission is allocated sufficient radio resources for transmission on an air-interface.

This feature ensures that the wireless 5G and TSN systems are jointly optimized for traffic flows while considering system-level, 5G-centric, and TSN-centric constraints.

In an embodiment, scheduling the frame transmissions for the first data stream sequentially on each link comprises: scheduling multiple frame transmissions of the first data stream consecutively within the cycle.

Multiple frames of a flow can be scheduled consecutively for minimizing end-to-end latency or spread in time domain for transmission from the source to interleave best-effort traffic flows In an embodiment, scheduling the frame transmissions for the first data stream sequentially on each link comprises: introducing a frame transmission gap between reception and transmission of a frame at a TSN bridge.

In an embodiment, scheduling the frame transmissions for the first data stream sequentially on each link comprises: when the wireless 5G network receives a frame transmission, starting a wireless 5G window immediately.

In an embodiment, scheduling the frame transmissions for the first data stream sequentially on each link comprises; wherein the link is a wireless 5G link, wherein an existing wireless 5G window is not available for frame transmission, define a new wireless 5G window; determine a maximum transmission time on the air-interface and the core network of the wireless 5G network; and calculate a length of the window for frame transmission based on the maximum transmission time.

This feature enables the minimization of the length of the wireless 5G window such that the flow/data stream requirements are fulfilled In an embodiment, scheduling the frame transmissions for the first data stream sequentially on each link comprises; if the link is a wireless 5G link, if an existing wireless 5G window is available for frame transmission, allocate the frame transmission to the existing wireless 5G window; and update the length of the window based on an additional time for transmitting the frame transmission.

This feature enables the minimization of the length of the wireless 5G window such that the flow/data stream requirements are fulfilled In an embodiment, wherein there is a transmission gap between two scheduled frame transmissions on a TSN link, wherein the transmission gap is at least twice a size of a frame transmission on the TSN link, the method further comprising: scheduling a best-effort frame transmission between the two scheduled frame transmissions on the TSN link.

According to a second aspect of the invention there is provided a system for scheduling and transmitting frames of a first data stream in a composite network, wherein the composite network comprises a plurality of nodes, the first data stream associated with a route from a first node of the plurality of nodes to a second node of the plurality of nodes, the route comprising at least one link, the link being either a wireless 5G link or a TSN link, a system comprising: a time-sensitive network (TSN) comprising at least one time-sensitive network (TSN) bridge; a wireless 5G network comprising an air interface and a core network, the system configured to: determine an allocation window based on a cycle time of the first data stream, wherein the allocation window defines a period during which at least one cycle of each data stream in the network is completed, wherein a cycle is a fixed length time window; determine a number of cycles for the first stream based on the allocation window and the cycle time of the first data stream; determine a number of frame transmissions for each cycle of the first data stream based on a payload of the first data stream and a maximum transmission unit (MTU) of the composite network; schedule the frame transmissions for each cycle of the first data stream sequentially on each link along the route and within the allocation window; and for each link, allocate a TSN slot or a wireless 5G window for each frame transmission based on a type of the link.

Figure 1:
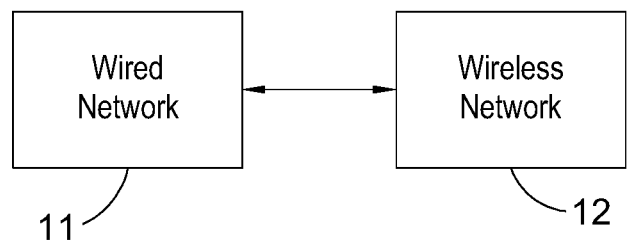
FIG. 1 illustrates schematically a network arrangement of a wireless network and a time-sensitive network, in accordance with embodiments of the present disclosure.

FIG. 1 shows, in general schematic form, a composite, or hybrid, network arrangement 10 comprising a wired (or guided) network 11 and a wireless network 12.

Figure 2:
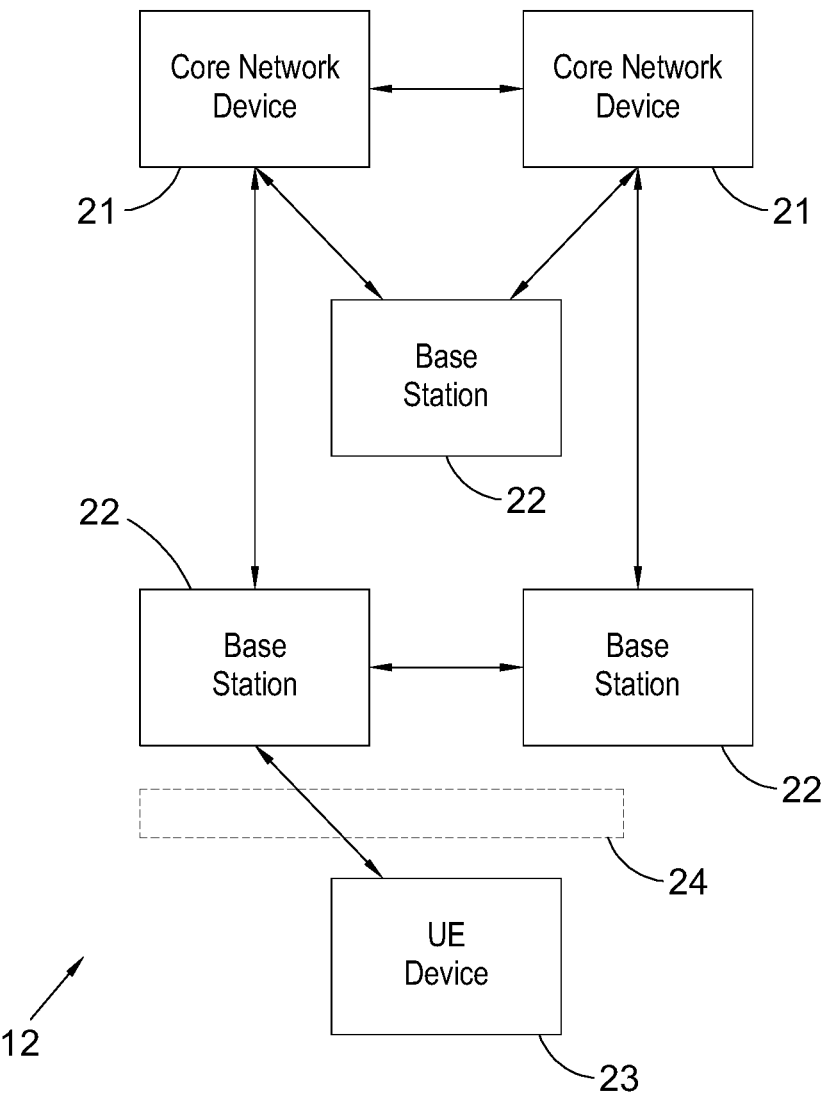
FIG. 2 illustrates the architecture of the wireless network of FIG. 1.

FIG. 2 shows the architecture of the wireless network of FIG. 1, implemented as a 5G network. The wireless network comprises a plurality of core network components 21 connected with a plurality of base stations 22. The base stations 22 in a 5G network are referred to as next-generation Node B or gNB. Each base station 22 can establish wireless communication with one or more User Equipment (UE) devices (23). The air interface (24) is the radio-frequency portion between the UE device 23 and the active base station 22.

Figure 3:
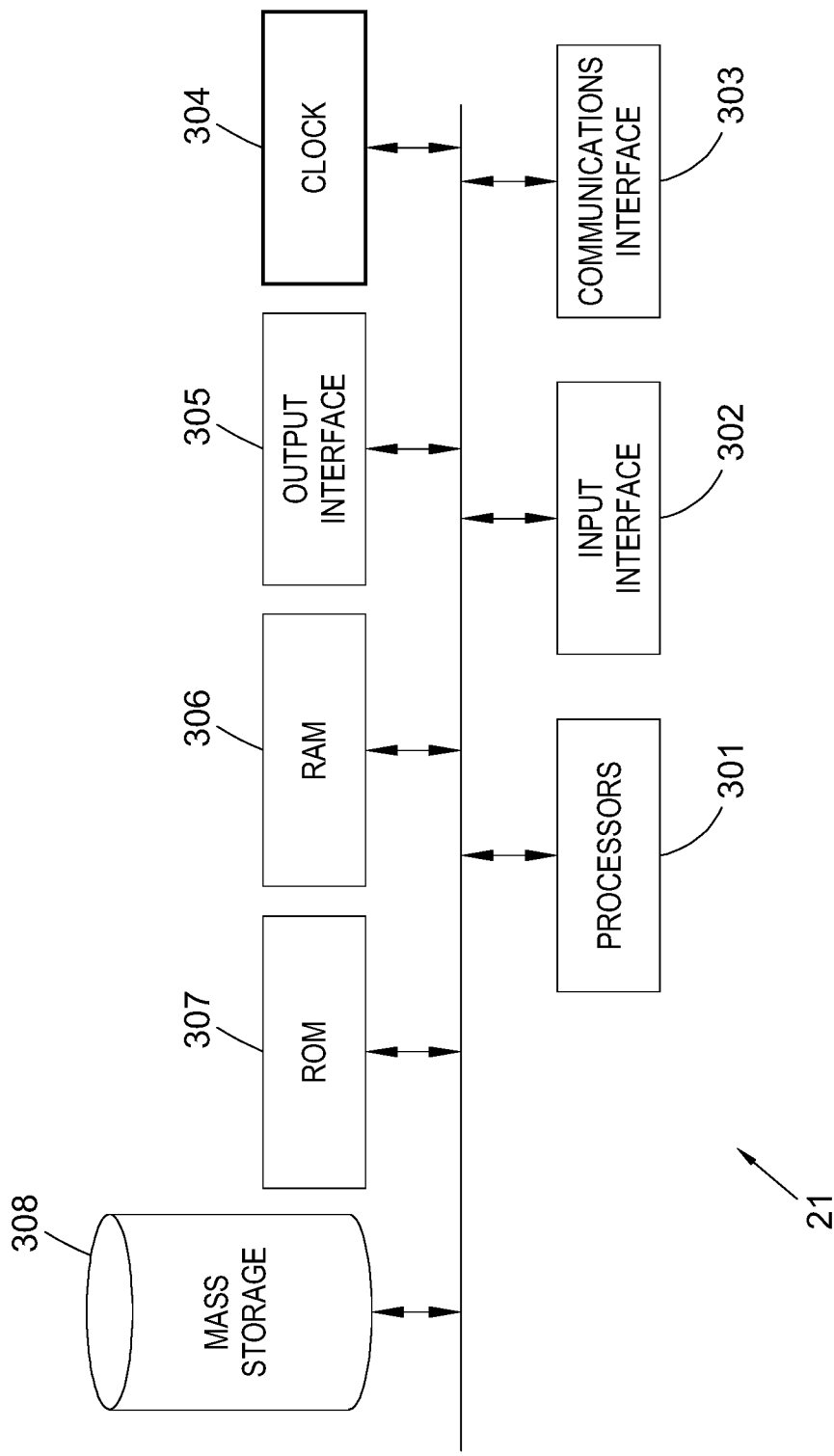
FIG. 3 illustrates the architecture of a core network component of the wireless network of FIG. 2.

FIG. 3 illustrates the architecture of a core network component 21. As shown in FIG. 3, the core network component 21 is a computer apparatus, in structure and function. It may share certain features with general purpose computer apparatus, but some features may be implementation specific, given the specialised function for which the network component 21 is to be put. The reader will understand which features can be of general-purpose type, and which may be required to be configured specifically for use in the current context.

The apparatus 21 thus comprises one or more processors 301, either generally provisioned, or configured for other purposes such as mathematical operations, audio processing, managing a communications channel, and so on.

An input interface 302 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 305 is operable to provide a facility for output of signals to a user or another device. Such output could include a display signal for driving a local video display unit (VDU) or any other device.

A communications interface 303 implements a communications channel, whether broadcast or end-to-end, with one or more recipients of signals. In the context of the present embodiment, the communications interface is configured to cause emission of signals for communication with base stations 22 or other core network components 21.

The processors 301 are operable to execute computer programs, in operation of the component 21. In doing this, recourse is made to data storage facilities provided by a mass storage device 38 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 307 is preconfigured with executable programs designed to provide the core of the functionality of the component 21, and a Random Access Memory 306 is provided for rapid access and storage of data and program instructions in the pursuit of execution of a computer program. Each of these is configured to implement a communications protocol adopted by plural interoperable devices.

A clock 304 provides a timing signal for all other components of the device. The clock signal can be adjusted if required, for synchronization with other devices.

Figure 4:
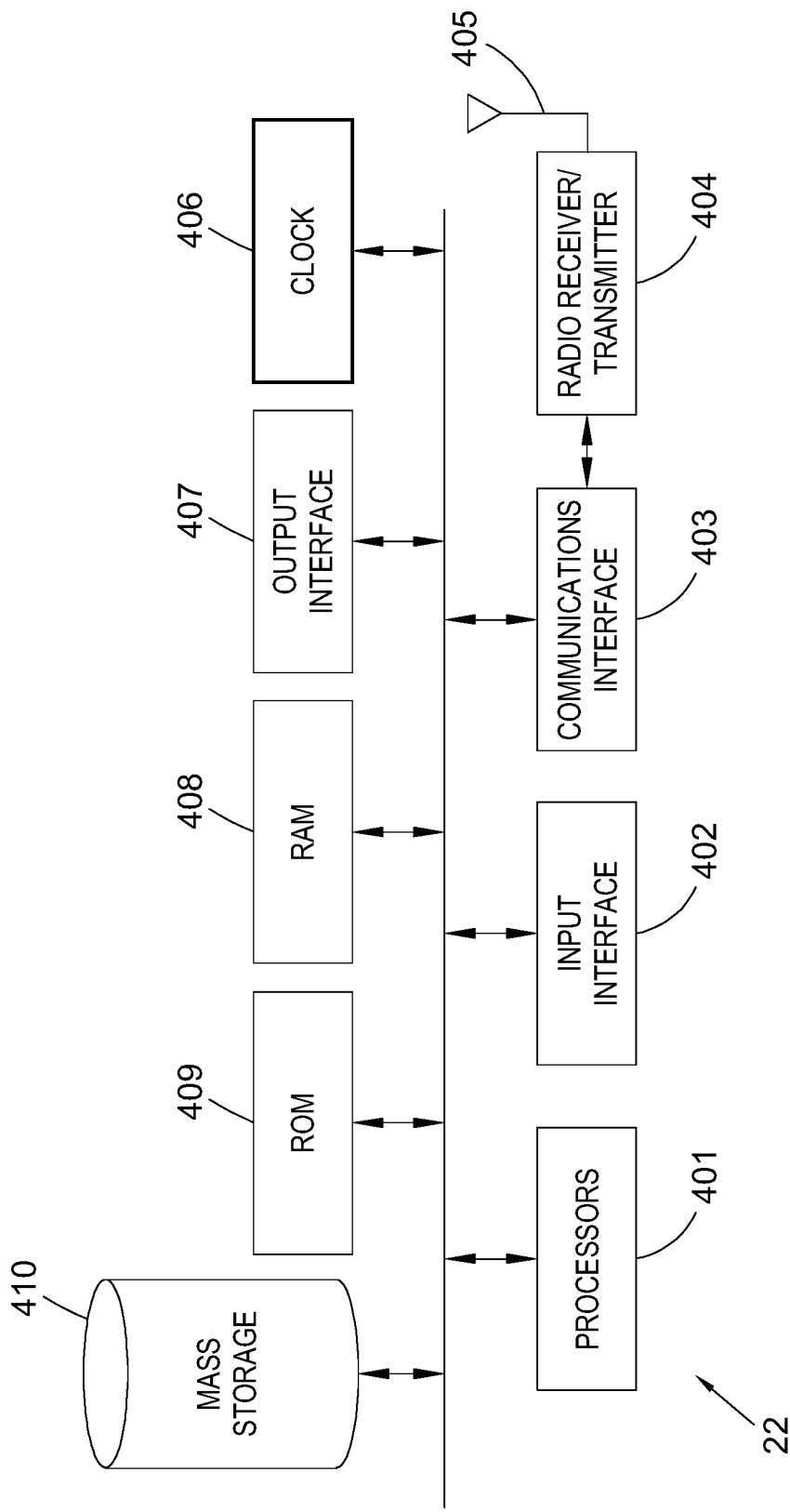
FIG. 4 illustrates the architecture of a base station of the wireless network of FIG. 2.

FIG. 4 illustrates the architecture of a base station 22. As shown in FIG. 4, the base station 22 is a computer apparatus, in structure and function. It may share certain features with general purpose computer apparatus, but some features may be implementation specific, given the specialised function for which the base station is to be put. The reader will understand which features can be of general-purpose type, and which may be required to be configured specifically for use in a wireless communications transmitter.

The base station 22 thus comprises one or more processors 401, either generally provisioned, or configured for other purposes such as mathematical operations, audio processing, managing a communications channel, and so on.

An input interface 402 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader. It will be appreciated that such user input actions would not normally be required in general operation, but may be required in installation or maintenance of the equipment.

Likewise, an output interface 406 is operable to provide a facility for output of signals to a user or another device. Such output could include a display signal for driving a local video display unit (VDU) or any other device.

A communications interface 403 implements a communications channel, whether broadcast or end-to-end, with one or more recipients of signals. In the context of the present embodiment, the communications interface is configured to cause emission of a signal encoded by the base station. The communications controller 403 is in communication with a receive/transmit unit 404 which is operable to translate signals between the domain used by the controller and the radio signal domain used for wireless communication, the radio signal domain signals being transmitted and received at an antenna 405.

The processors 401 are operable to execute computer programs, in operation of the base station 22. In doing this, recourse is made to data storage facilities provided by a mass storage device 410 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 409 is preconfigured with executable programs designed to provide the core of the functionality of the base station 22, and a Random Access Memory 408 is provided for rapid access and storage of data and program instructions in the pursuit of execution of a computer program. Each of these is configured to implement a communications protocol adopted by plural interoperable devices.

A clock 406 provides a timing signal for all other components of the device. The clock signal can be adjusted if required, for synchronization with other devices.

Figure 5:
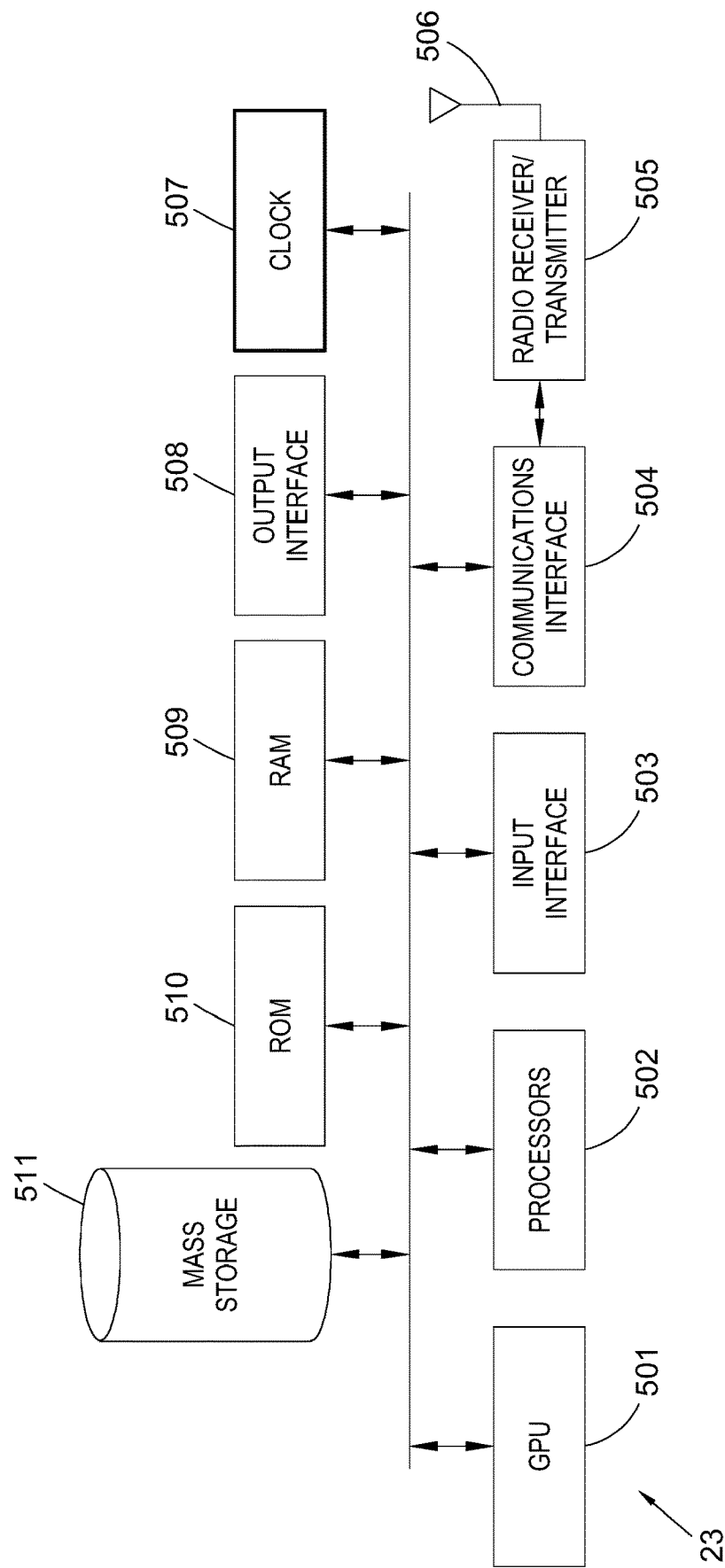
FIG. 5 illustrates the architecture of a user equipment device of the wireless network of FIG. 2.

FIG. 5 illustrates the architecture of a UE 23. As shown in FIG. 5, the UE 23 is a computer apparatus, in structure and function. It may share certain features with general purpose computer apparatus, but some features may be implementation specific, given the specialised function for which the UE 23 is to be put. The reader will understand which features can be of general-purpose type, and which may be required to be configured specifically for use in a user device.

The UE 23 thus comprises a parallel processor 501 configured for specific use in processing large data sets, suitable for use in digital communication. The UE 23 also comprises one or more other processors 502, either generally provisioned, or configured for other purposes such as mathematical operations, audio processing, managing a communications channel, and so on.

An input interface 503 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 508 is operable to provide a facility for output of signals to a user or another device. Such output could include a display signal for driving a local video display unit (VDU) or any other device.

A communications interface 504 implements a communications channel, whether broadcast or end-to-end, with one or more recipients of signals. In the context of the present embodiment, the communications interface is configured to cause emission and reception of signals via a receive/transmit interface 505 and a radio antenna 506.

The processors 501, 502 are operable to execute computer programs, in operation of the UE 23. In doing this, recourse is made to data storage facilities provided by a mass storage device 511 which is implemented to provide large-scale data storage albeit on a relatively slow access basis, and will store, in practice, computer programs and, in the current context, communication data, in preparation for execution of an encoding process prior to the placement of encoded data on a transmitted signal.

A Read Only Memory (ROM) 510 is preconfigured with executable programs designed to provide the core of the functionality of the UE 23, and a Random Access Memory 509 is provided for rapid access and storage of data and program instructions in the pursuit of execution of a computer program. Each of these is configured to implement a communications protocol adopted by plural interoperable devices.

A clock 507 provides a timing signal for all other components of the device. The clock signal can be adjusted if required, for synchronization with other devices.

Figure 6:
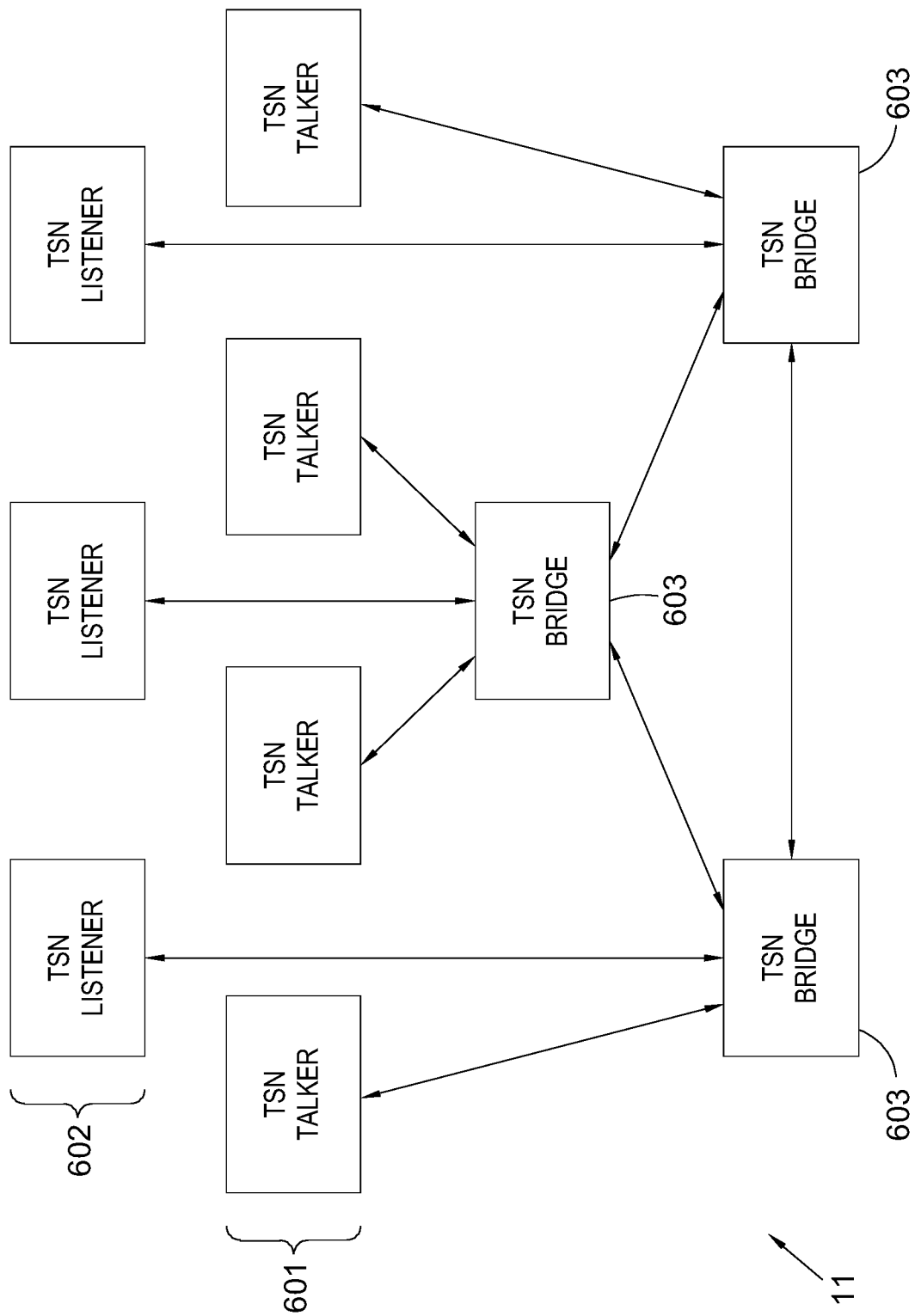
FIG. 6 illustrates a wired network implementing the time-sensitive network of FIG. 2, in the form of a fully distributed TSN model.

FIG. 6 illustrates an example of a fully distributed TSN model. This TSN model implements the wired network 11 of FIG. 1. As shown, the TSN network 11 comprises a plurality of TSN end stations, namely TSN talkers 601 (controllers, sensors, etc.) and TSN listeners 602 (actuators, robots, etc.) sharing information over a TSN network comprising of one or more TSN bridges 603.

Figure 7:
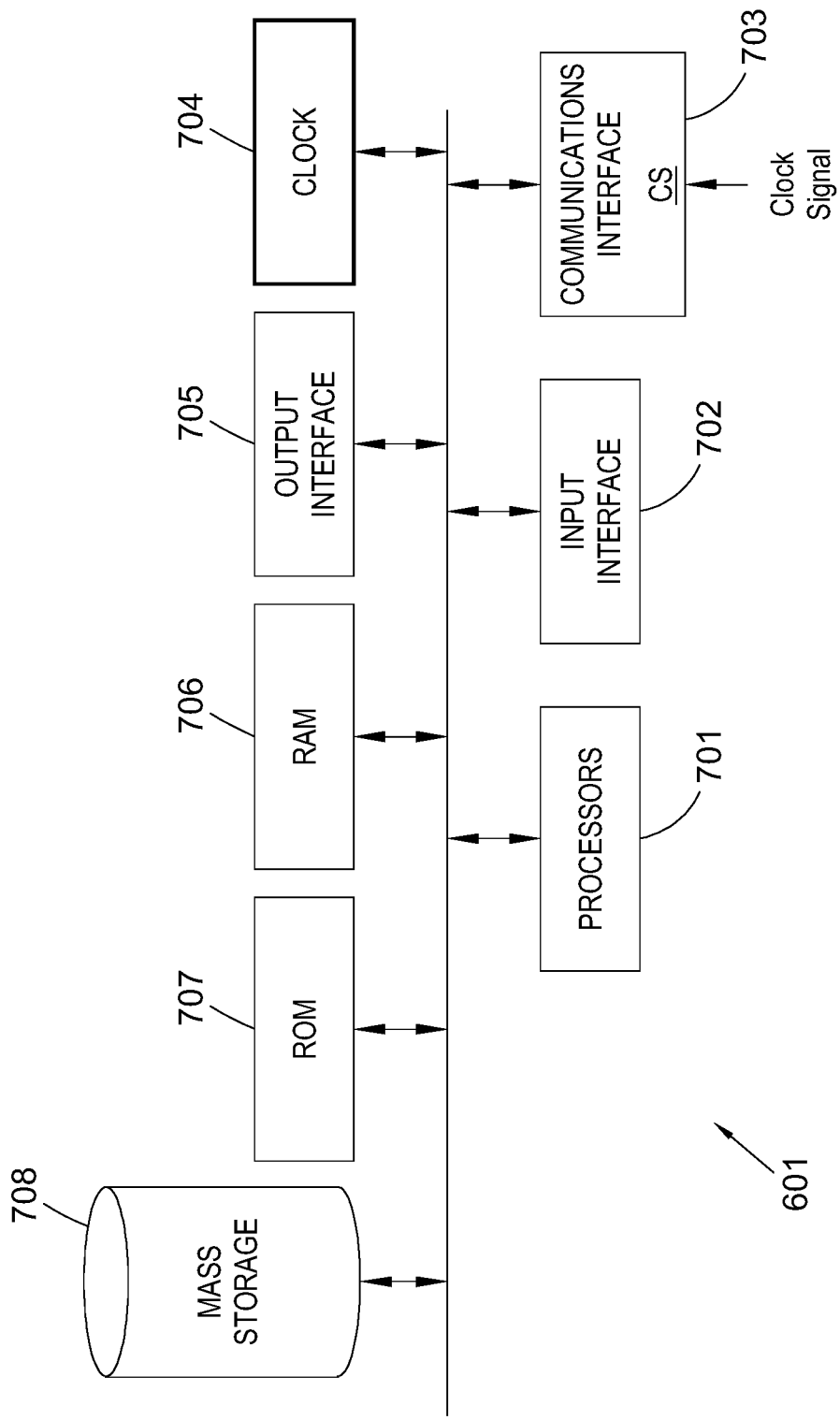
FIG. 7 illustrates a "talker" network element of the wired network of FIG. 6.

FIG. 7 illustrates internal architecture of a "talker" end station 601, in accordance with the present embodiment. As shown in FIG. 7, the end station 601 is a computer apparatus, in structure and function. It may share certain features with general purpose computer apparatus, but some features may be implementation specific, given the specialised function for which the station 601 is to be put. The reader will understand which features can be of general-purpose type, and which may be required to be configured specifically for use in a user device.

The station 601 thus comprises one or more processors 701, either generally provisioned, or configured for other purposes such as mathematical operations, audio processing, managing a communications channel, and so on.

An input interface 702 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 705 is operable to provide a facility for output of signals to a user or another device. Such output could include a display signal for driving a local video display unit (VDU) or any other device.

A communications interface 703 implements a communications channel, whether broadcast or end-to-end, with one or more recipients of signals. In the context of the present embodiment, the communications interface is configured to cause emission of control signals via an interface not shown for reasons of clarity, for control of other equipment not within the scope of this disclosure. Such equipment could include industrial equipment or the like. The communications interface 703, as shown, has a clock slave port CS through which it can be in receipt of a clock signal from another device to which it has a wired connection.

The processors 701 are operable to execute computer programs, in operation of the end station 601. In doing this, recourse is made to data storage facilities provided by a mass storage device 708 which is implemented to provide large-scale data storage albeit on a relatively slow access basis, and will store, in practice, computer programs and data as the need arises.

A Read Only Memory (ROM) 707 is preconfigured with executable programs designed to provide the core of the functionality of the end station 601, and a Random Access Memory 706 is provided for rapid access and storage of data and program instructions in the pursuit of execution of a computer program. Each of these is configured to implement a communications protocol adopted by plural interoperable devices.

A clock 704 provides a timing signal for all other components of the device. The clock signal is adapted to trigger on the basis of the received clock signal at the CS port, and can be adjusted if required, for synchronization with other devices.

Figure 8:
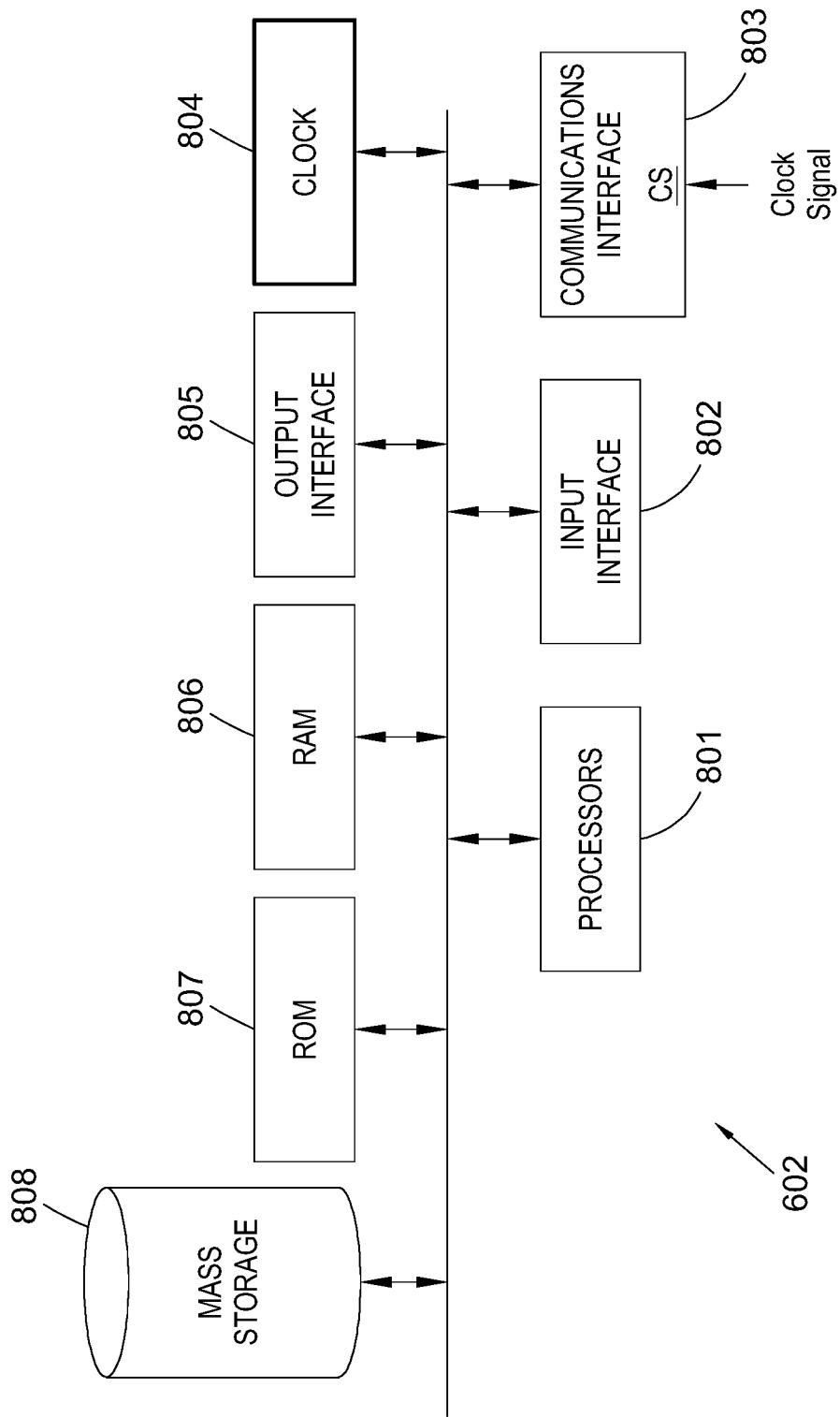
FIG. 8 illustrates a "listener" network element of the wired network of FIG. 6.

FIG. 8 illustrates internal architecture of a "listener" end station 602, in accordance with the present embodiment. As shown in FIG. 8, the end station 602 is a computer apparatus, in structure and function. It may share certain features with general purpose computer apparatus, but some features may be implementation specific, given the specialised function for which the station 602 is to be put. The reader will understand which features can be of general-purpose type, and which may be required to be configured specifically for use in a user device.

The station 602 thus comprises one or more processors 801, either generally provisioned, or configured for other purposes such as mathematical operations, audio processing, managing a communications channel, and so on.

An input interface 802 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 805 is operable to provide a facility for output of signals to a user or another device. Such output could include a display signal for driving a local video display unit (VDU) or any other device.

A communications interface 803 implements a communications channel, whether broadcast or end-to-end, with one or more recipients of signals. In the context of the present embodiment, the communications interface is configured to cause emission of control signals via an interface not shown for reasons of clarity, for control of other equipment not within the scope of this disclosure. Such equipment could include industrial equipment or the like. The communications interface 1203, as shown, has a clock slave port CS through which it can be in receipt of a clock signal from another device to which it has a wired connection.

The processors 801 are operable to execute computer programs, in operation of the end station 602. In doing this, recourse is made to data storage facilities provided by a mass storage device 808 which is implemented to provide large-scale data storage albeit on a relatively slow access basis, and will store, in practice, computer programs and data as the need arises.

A Read Only Memory (ROM) 807 is preconfigured with executable programs designed to provide the core of the functionality of the end station 602, and a Random Access Memory 806 is provided for rapid access and storage of data and program instructions in the pursuit of execution of a computer program. Each of these is configured to implement a communications protocol adopted by plural interoperable devices.

A clock 804 provides a timing signal for all other components of the device. The clock signal is adapted to trigger on the basis of the received clock signal at the CS port, and can be adjusted if required, for synchronization with other devices.

Figure 9:
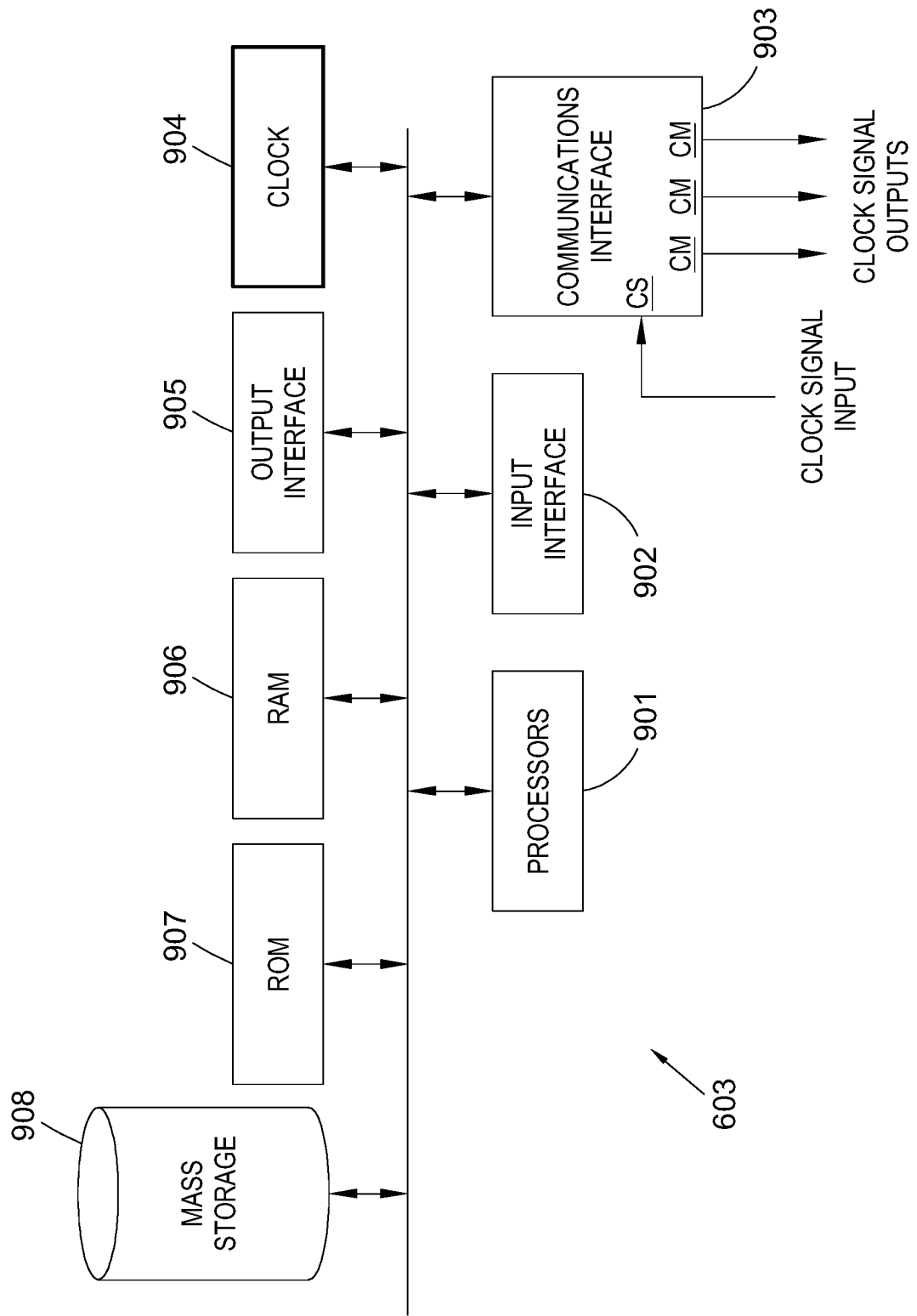
FIG. 9 illustrates a TSN bridge of the wired network of FIG. 6.

FIG. 9 illustrates the internal architecture of a TSN bridge 603 in accordance with the present embodiment. As shown in FIG. 9, the bridge 603 is a computer apparatus, in structure and function. It may share certain features with general purpose computer apparatus, but some features may be implementation specific, given the specialised function for which the bridge 603 is to be put. The reader will understand which features can be of general-purpose type, and which may be required to be configured specifically for use in a user device.

The bridge 603 thus comprises one or more processors 901, either generally provisioned, or configured for other purposes such as mathematical operations, audio processing, managing a communications channel, and so on.

An input interface 902 provides a facility for receipt of user input actions. Such user input actions could, for instance, be caused by user interaction with a specific input unit including one or more control buttons and/or switches, a touchscreen, a keyboard, a mouse or other pointing device, a speech recognition unit enabled to receive and process speech into control commands, a signal processor configured to receive and control processes from another device such as a tablet or smartphone, or a remote-control receiver. This list will be appreciated to be non-exhaustive and other forms of input, whether user initiated or automated, could be envisaged by the reader.

Likewise, an output interface 905 is operable to provide a facility for output of signals to a user or another device. Such output could include a display signal for driving a local video display unit (VDU) or any other device.

A communications interface 903 implements a communications channel, whether broadcast or end-to-end, with one or more recipients of signals. In the context of the present embodiment, the communications interface is configured to cause onward transmission of signals received at the device, intended for another destination. The communications interface 903, as shown, has a clock slave port CS through which it can be in receipt of a clock signal from another device to which it has a wired connection. Further, the communications interface 903 comprises one or more clock master ports CM which, when activated, cause emission of a master clock signal for used by other connected devices.

The processors 901 are operable to execute computer programs, in operation of the bridge 1003. In doing this, recourse is made to data storage facilities provided by a mass storage device 908 which is implemented to provide large-scale data storage albeit on a relatively slow access basis, and will store, in practice, computer programs and data as the need arises.

A Read Only Memory (ROM) 907 is preconfigured with executable programs designed to provide the core of the functionality of the bridge 603, and a Random Access Memory 906 is provided for rapid access and storage of data and program instructions in the pursuit of execution of a computer program. Each of these is configured to implement a communications protocol adopted by plural interoperable devices.

A clock 904 provides a timing signal for all other components of the device. The clock signal is adapted to trigger on the basis of the received clock signal at the CS port, and can be adjusted if required, for synchronization with other devices.

To realize converged operation in a composite network, there must be seamless (tight) integration between 5G and TSN systems. One of the main approaches proposed in 3GPP Release 16 is the bridge model wherein the 5G system appears as a virtual TSN bridge or a black box to the TSN system.

Time-sensitive networking (TSN) is a technology, underpinned by a set of standards within the IEEE 802.1 working group, that aims to improve real-time capabilities of standard Ethernet. TSN provides guaranteed data delivery with deterministic and bounded latency and extremely low data loss. TSN supports both time-critical and best-effort traffic over a single standard Ethernet network. TSN is widely recognized as long-term replacement of proprietary wired technologies for industrial communication. It is likely to co-exist with high-performance wireless technologies like 5G. Therefore, integration of TSN and 5G is crucial in the envisioned digital transformation of industrial systems. Such integration provides end-to-end deterministic connectivity leading to various design simplifications in industrial automation networks while enabling unprecedented new applications.

To realize converged operation, there must be seamless (tight) integration between 5G and TSN systems. One of the main approaches proposed in 3GPP Release 16 is the bridge model wherein the 5G system appears as a virtual TSN bridge or a black box to the TSN system. The 5G system handles TSN service requirements through its internal protocols and procedures. It provides (logical) ingress and egress ports for the TSN system. The 5G system may provide virtual bridge functionality to multiple TSN domains.

Integration of TSN and 5G systems creates several challenges as well. For instance, converged operation of a heterogeneous network comprising TSN and 5G nodes, which becomes particularly challenging as the two technologies differ in capabilities and internal protocols. To achieve end-to-end deterministic connectivity and to provide guarantees on real-time performance, a system-level schedule is required that provides an optimized schedule while capturing user/stream requirements and capabilities of TSN bridges and 5G system.

TSN operates on the principle of network-wide time synchronization and scheduling. Typically, in a TSN system, a centralized network configuration (CNC) entity computes schedules and configures all TSN bridges and end stations. Time-Aware Shaper (TAS), defined by the IEEE 802.1Qbv standard, is a key mechanism in TSN to send frames with bounded latency and jitter according to a pre-defined global schedule according to a global communication schedule implemented via the so-called Gate Control Lists (GCLs) that permit/restrict frame transmission through a timed gate for each queue. However, such scheduling techniques cannot be directly applied to integrated 5G and TSN systems as (a) as the two systems differ significantly in their fundamental capabilities, (b) a global TSN schedule cannot be enforced over a 5G system due to its internal dynamics and imperfections of wireless environments, (c) potential time synchronization inaccuracies between the two systems, (d) difference in transmission time on wireless (5G) interface compared to that on the wired (TSN) interface, and (e) a 5G system can be shared with multiple TSN domains.

To this end, there is a fundamental requirement of a system-level schedule for integrated 5G/TSN systems that considers the capabilities of both systems and provides an optimal schedule through joint optimization of 5G and TSN systems.

Figure 10:
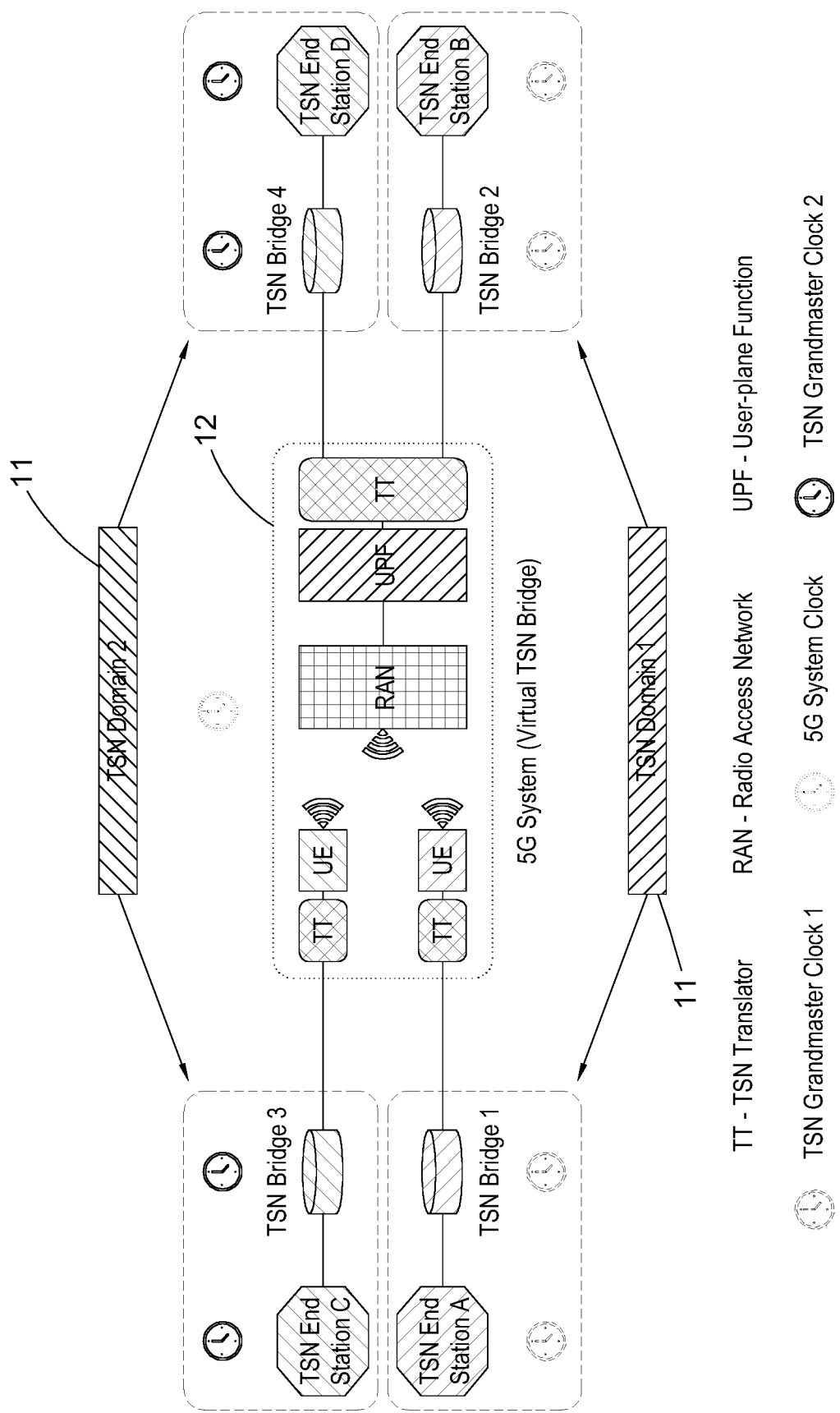
FIG. 10 illustrates a composite, or hybrid, network according to an embodiment.

FIG. 10 illustrates a composite, or hybrid, network. The network is a bridge model wherein the wireless system 12 provides ingress and egress ports for the wired (TSN) system 11 via the TSN Translators (TTs). Such TTs, which are used for both control-plane and user-plane, are located on the user-equipment (UE) side as well as network side. The wireless system handles TSN service requirements through its internal protocols.

The wireless (5G) system 12 provides virtual bridge functionality to multiple TSN domains, i.e TSN Domain 1 and TSN Domain 2. This implies that the 5G system must transmit traffic (in an end-to-end manner) belonging to different TSN domains within fixed-length cycles (time windows). Therefore, end-to-end optimization of a 5G system becomes particularly important for providing performance guarantees for single domain as well as multi-domain TSN systems.

Without any loss of generality, a centralized configuration model is considered for TSN and 5G integration where the centralized network controller (CNC), is responsible for configuration and management of the integrated system. It is assumed that each TSN domain operates according to a schedule derived by the CNC.

Figure 11:
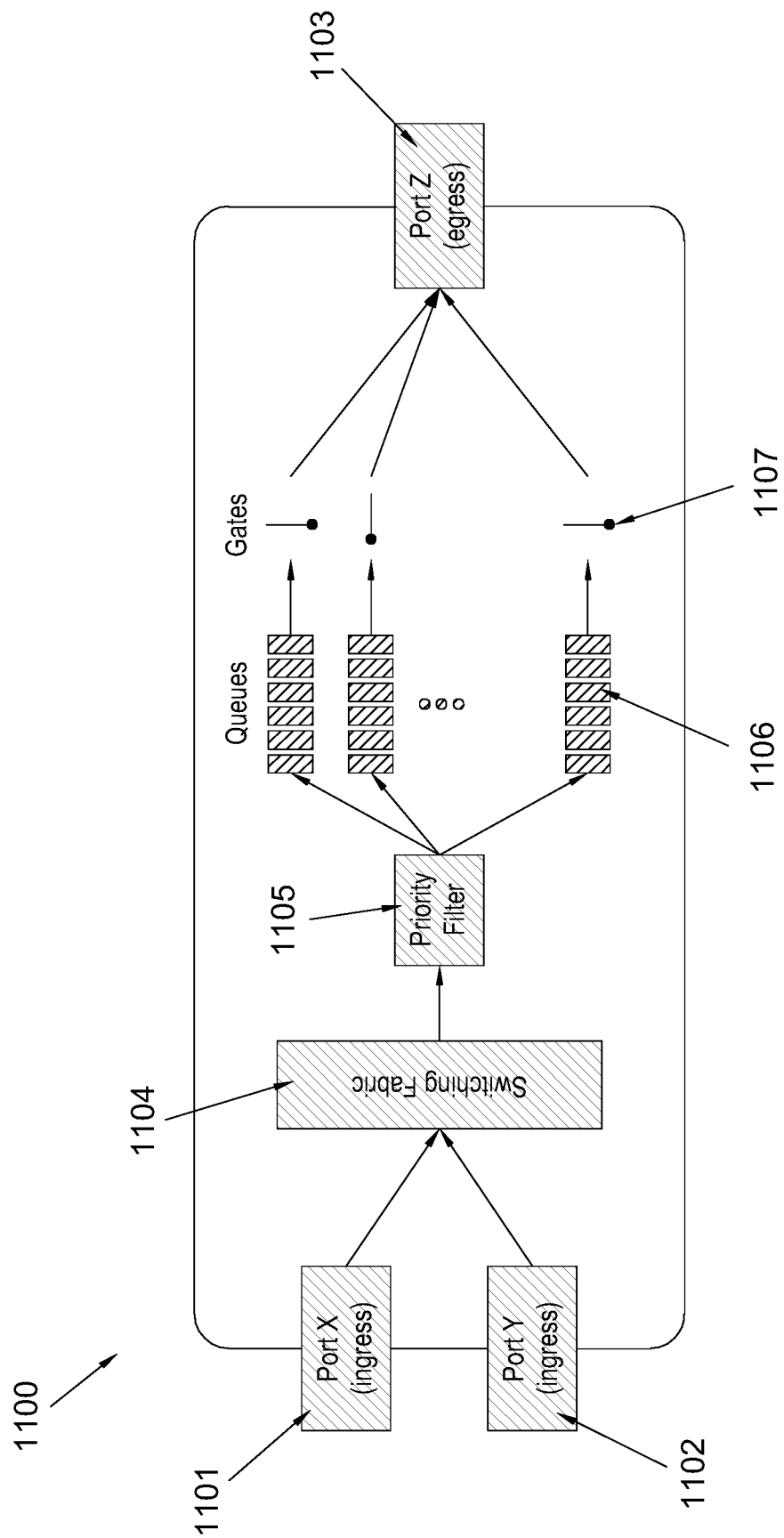
FIG. 11 illustrates a simplified model of an IEEE 802.1Qbv-compatible switch.

FIG. 11 shows, in general schematic form, a model of an IEEE 802.1Qbv-compatible switch 1100 used in TSN bridges. The switch has three ports—ingress port Port X 1101, ingress port Port Y 1102 and egress port Port Z 1103. The switch 1100 of FIG. 1 may have more than two ingress ports, and more than two egress ports.

The switching fabric 1104 is a combination of hardware and software that moves data coming in to a network node out by the correct port (door) to the next node in the network. The switching fabric determines to which output (egress) port a received frame on an input (ingress) ports will be forwarded. Each egress port has a priority filter 1105 that determines which queue 1106 (out of the 8 available) of the port an incoming frame will be stored. The priority filter distributes the incoming frames based on classification criteria like e.g. the priority code point (PCP) of the IEEE802.1Q header.

The frames in a queue 1106 are stored in a first-in-first-out (FIFO) manner. Some queues 1106 are reserved for control traffic (scheduled traffic) while others are used for best-effort traffic. There is a timed gate 1107 associated with each queue 1106 which can be either open or closed according to a pre-defined Gate Control List (GCL).

The queues 1106 buffer the respective frames until their transmission. The timed gate 1107 then enables or disables the transmission of frames according to a predefined static schedule. Hence, scheduled events determine at which time instants a queue 1106 is opened and traffic is forwarded to the egress port and at which time instants the queue 1106 is closed such that any pending traffic remains buffered. If multiple queues 1106 are opened at the same time, the queue priority determines which of the queues 1106 is allowed to forward frames.

Figure 12:
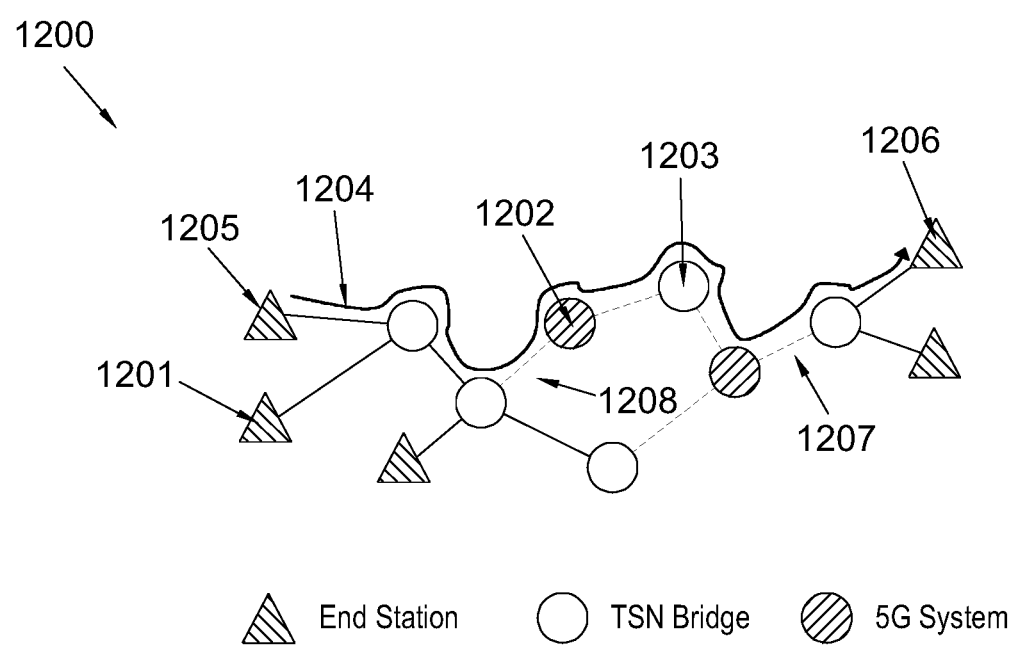
FIG. 12 illustrates a composite network model.

FIG. 12 shows a network model 1200 that comprises a plurality of nodes, wherein the nodes are end stations 1201, TSN bridges 1202 or 5G systems 1203. The end stations 1201 are sources/sinks of data streams which encounter one or more TSN bridges and 5G systems during end-to-end transmission. Route 1204 is a first route from a first source 1205 to a first destination 1206 in the network.

The system comprises a number of links between nodes in the network. A wired link, or TSN link, connects a sender TSN bridge to either a TSN bridge or a 5G system as receiver. A 5G link, or wireless link, connects a sender 5G system to either another 5G system or a TSN bridge as receiver. The sets of TSN links and 5G links in the network are denoted by $\mathcal{N}_{TSN}$ and $\mathcal{N}_{5G}$, respectively.

For route 1204 of FIG. 12, the route 1204 comprises a number of links, including wired links 1207 and wireless links 1208.

The TSN traffic in a 5G system can enter via the UE-side or the network-side. System-level scheduling is handled by the centralized network configuration (CNC) entity which is also referred to as the centralized network controller. A fully synchronized network is assumed where end stations, TSN bridges, and 5G systems are synchronized.

Control traffic flows (or control data streams) which are characterized by strict requirements in terms of latency and jitter are considered here. However, other data streams may be used, such as best effort traffic.

It is assumed that the path (route) information of a flow is available to the CNC. The set of control flows is denoted by Fc. The requirements of a control flow 'f' is characterized by a tuple $<D^f, L^f, T^f, J^f>$, where $D^f$ denotes the end-to-end latency, $L^f$ is the payload (data size in bytes), $T^f$ is the cycle time or period, and $J^f$ is the jitter tolerance.

As the payload can be higher than the maximum transmission unit (MTU) of a link, a flow instance is defined as a set of frames, each with size less than or equal to the MTU. Each frame is characterized by its assigned time offset $\varphi^{fr}_c$ and transmission duration $B^f_{rc}$. The time offset is for each frame fr of the flow, for each link, and for each cycle c.

A TSN link is typically characterized by the tuple $<S, PD, MT>$, where S is the link speed, PD is propagation delay, and MT is the macrotick (length of the discrete time unit defining the granularity of the scheduling time unit). On the other hand, for the sake of system-level scheduling, a 5G system is characterized in terms of its maximum end-to-end latency, the granularity of reference time indication, the available bandwidth for air-interface, and the supported quality-of-service (QoS) classes.

Constraints for Joint Optimization of 5G and TSN Systems

The disclosed method and systems provide a low-complexity heuristic system-level scheduling solution for converged operation of 5G and TSN systems. The disclosed method and systems jointly optimize 5G and TSN systems for control and best-effort traffic flows while considering system-level, 5G-centric, and TSN-centric constraints. The disclosed method and systems are aligned with O-RAN framework and pave the way for realizing a centralized network configuration (CNC) entity for integrated TSN and 5G deployments.

For joint optimization, the methods and systems consider system-level, TSN-centric, and 5G-centric constraints that provide a feasible solution space.

First, different system-level constraints which are important for joint optimization are described.

End-to-End Latency Constraint: Each flow has a maximum end-to-end latency requirement which is given by $D^f$. The end-to-end latency constraint ensures that each frame is delivered to the destination end station within the delay margin/budget.

Jitter Constraint: Each flow is also characterized by a jitter requirement which is given by $J^f$. The jitter constraint ensures that the latency variation experienced by a flow is within the tolerance limits.

Frame Transmission Constraint: This constraint ensures that each frame of a flow instance is scheduled with a positive offset and it is completely transmitted within its cycle.

Frame Transmission Order Constraint: This constraint dictates that each frame in the network can only be transmitted over a link (either TSN or 5G) after it has been completely received over the previous link (either TSN or 5G).

Link Transmission Constraint: This constraint ensures that no two frames routed through the same link can overlap in time.

Next, TSN-centric constraints which must be considered for joint optimization are described.

Frame Isolation Constraint: The frame isolation constraint prevents different control traffic flows to interleave in the egress queues. It specifies that the frame of one flow cannot arrive at a queue of a TSN bridge as long as another frame from another flow is in the queue.

GCL Generation Constraint: This constraint ensures that the schedule for TSN bridges is translated into positive and non-overlapping gate events.

Maximum Queues Constraint: This constraint specifies the maximum number of queues available for control flows in a TSN bridge.

Finally, 5G-centric constraints which are important for joint optimization are described.

Air-Interface Transmission Constraint: This constraint specifies the maximum and minimum bounds on the offsets for flow transmission based on the air-interface structure of the 5G system.

Radio Resource Allocation Constraint: This ensures that a TSN frame is allocated sufficient radio resources for transmission on the air-interface. It also handles multi-user radio resource allocation. Such methods may include those outlined in U.S. patent application Ser. No. 17/130,573, which is incorporated in its entirety herein by reference.

QoS Mapping Constraint: This constraint specifies the mapping of TSN traffic to 5G QoS profile.

System-Level Scheduling Algorithm Design

The described methods and systems provide system-level scheduling for converged operation of TSN and 5G systems. The scheduling problem can be described as follows.

Given an integrated system of end stations, TSN bridges, and 5G systems and a set of flows with statically-defined routes, the objective is to determine GCLs such that flow requirements are fulfilled.

FIG. 13 provides a high-level flow diagram of the algorithm. The scheduling algorithm considers overall network topology, flow requirements, scheduling constraints, and the capabilities of TSN bridges and 5G systems. As control traffic is cyclic, it computes an allocation window or a hyper-period at step S1301 that defines the common cycle time of all control flows and it is given by $$T_{HP}=LCM(\{T^f | \forall f \in F_c\}),$$

where LCM is the least common multiple function, i.e., the hyper-period is the least common multiple of the cycle time of all control flows.

At S1302 it is determined whether all flow instances have been scheduled. If not, then the flow with the most stringent requirements is determined and prioritised (S1303). The method then determine frame scheduling opportunities (S1304) and performs sequential scheduling for each frame (S1305). This is then repeated for each cycle in the allocation window (S1306). Once all flow instances have been computed the GCLs can be updated.

The described methods and systems provide a heuristic solution for system-level scheduling. It schedules all frames of a flow instance for an allocation window, i.e., for all cycles within a hyper-period. The flow with the most stringent requirements is given priority. Each frame is scheduled sequentially from source to destination (dictated by the flow path) and available scheduling opportunities (dictated by flow, TSN and 5G constraints). The described methods and systems allocate slots for transmissions over TSN links and windows for transmissions over 5G links. A slot is used for transmitting a single frame of a flow over a TSN link. On the other hand, a window is allocated for end-to-end transmission over a 5G system. A window for 5G link can be a used for transmitting frames from different flows. The algorithm continues until all flow instances have been scheduled. The schedule is translated to GCLs when all the flow instances have been scheduled.

FIG. 14 illustrates a scheduling algorithm according to an embodiment. FIG. 14 captures key steps of sequential scheduling. At S1401, it computes the number of cycles of a flow per the allocation window as $N_c^f = T_{HP}/T^f$. The scheduling algorithm considers route/path information as a set of links, i.e., $[n_1, n_2, \ldots, n_{last}]$ from the source to the destination. At S1402, the algorithm determines a scheduling opportunity for the first frame in the first cycle on the first link $n_1$. In case of a TSN link, the frame is allocated a TSN slot (S1404) which is dictated by a frame offset $\varphi^f_1$ and slot (transmission duration) $B^f_1$. These are given as follows.

$$\varphi^{fr}_1 \in [0, T^f]; B^f_1 = \lceil L^f/n_1 \cdot S \rceil$$

where the ceiling function is as per link precision, i.e., $n_1 \cdot MT$. Note that the frame offset and transmission duration are associated with a queue on the egress port.

In case of a wireless or 5G link, the frame is allocated a wireless or 5G window (S1405). The duration of a 5G window is computed based on the 5G window optimization algorithm which is described later. The set of scheduling opportunities (described later) for a link is updated once a frame has been scheduled (S1406). The scheduling algorithm continues for each link on the route (S1407) until the frame is scheduled for transmission to the destination. The algorithm is repeated for each frame of the flow instance (S1408) and for each cycle in the allocation window (S1409).

Note that the sequential scheduling approach natively fulfils different scheduling constraints including frame transmission constraint, frame transmission order constraint, and link constraint.

FIG. 15 illustrates a method of scheduling frame transmissions according to an embodiment. At S501, an allocation window is determined based on cycle time of a first data stream. At S1502, g a number of cycles for the first stream is determined based on the allocation window and the cycle time of the first data stream. At S1503, a number of frame transmissions for each cycle of the first data stream is determined based on a payload of the first data stream and a maximum transmission unit (MTU) of the composite network. At S150, the frame transmissions for each cycle of the first data stream are scheduled sequentially on each link along the route and within the allocation window. At S1506, a TSN slot or a wireless window is allocated for each frame transmission based on a type of the link.

Scheduling Opportunities

The described methods and systems maintain and exploit scheduling opportunities. The scheduling opportunities are continuously updated as frames are scheduled. Scheduling opportunity for a frame is based on computation of the earliest available frame offset ($E\varphi$) which fulfils scheduling constraints. The following scheduling opportunity rules are defined in this respect.

Rule SO 1: For the first transmission of a frame on a TSN link i, a scheduling opportunity is determined based on the available TSN slots on that TSN link i (not taken by frame transmissions from other data streams), the link transmission constraint, and the frame isolation constraint.

Link transmission constraint: $\{(\varphi^a_i + B^a_i + G_{int})\} \cup \{\varphi^b_i + B^b_i + G_{int}\} = \varphi$ where $\varphi^a_i$ is the time offset for the frame "a", $B^a_i$ is the transmission duration for frame "a", $\varphi^b_i$ is the time offset for the frame "b", $B^b_i$ is the transmission duration for frame "b", and where $G_{int}$ is the guard interval. The guard interval compensates for propagation delays, echoes and reflections at non-ideal TSN bridges or 5G systems.

Frame isolation constraint: $E\varphi^b_i \geq \varphi^a_i + B^a_i + G_{int}$ where $E\varphi^b_i$ is the earliest available frame offset for frame "b", where $\varphi^a_i$ is the time offset for the frame "a", $B^a_i$ is the transmission duration for frame "a", and where $G_{int}$ is the guard interval.

Rule SO 2: For the second or higher transmission of a frame on a TSN link i, a scheduling opportunity is determined based on the available TSN slots on that TSN link l (not taken by frame transmissions from other data streams), the frame isolation constraint, the frame transmission order constraint, and the link transmission constraint such that $$E\varphi^{fr}_i \geq \varphi^{fr}_{i-1} + B^{fr}_{i-1} + G_{int},$$

where $E\varphi^{fr}_i$ is the earliest available frame offset for frame "fr", where $\varphi^{fr}_{i-1}$ is the time offset for the frame on the link directly preceding link i, where $B^{fr}_{i-1}$ is the transmission duration for the frame on the link directly preceding link i, and where $G_{int}$ is the guard interval.

Rule SO 3: For a transmission on a TSN link i directly following a 5G link, where the TSN link is from a TSN network that receives frames from a 5G network, a scheduling opportunity is determined based on the available slots on the link i, the end-to-end transmission time of a frame over the 5G system, the frame isolation constraint, the frame transmission order constraint, and the link transmission constraint such that $$E\varphi^{fr}_i \geq T_{air} + T_{core},$$

where $E\varphi^{fr}_i$ is the earliest available frame offset for frame "fr", where $T_{air}$ and $T_{core}$ denote the transmission time over the air-interface and over the core network of the 5G system, respectively.

Rule SO 4: For transmission over a 5G link, a window scheduling opportunity is determined based on the frame transmission order constraint and the multi-user radio resource allocation constraint such that $$\{RB^a\} \cup \{RB^b\} = \varphi,$$

where RB$^a$ denotes the set of resource blocks allocated to a TSN UE for frame "a", where RB$^b$ denotes the set of resource blocks allocated to a TSN UE for frame "b".

Rule SO 5: Multiple frames of a flow can be scheduled consecutively for minimizing end-to-end latency or spread in time domain for transmission from the source to interleave best-effort traffic flows; however, they must be scheduled within the cycle time, i.e., $$\varphi^{fr}_i + B^{fr}_i + G_{int} \leq T_f, \forall fr \in N_{fr}, f \in F_c, i \in \mathcal{N}_{TSN} \cup \mathcal{N}_{5G},$$

where $N_{fr}$ is number of frames in a flow instance, $T_f$ is the cycle time, $F_c$ is the set of all control flows, or data streams, f is a data stream, $\mathcal{N}_{TSN}$ is the set of TSN links in the network, $\mathcal{N}_{5G}$ is the set of 5G links in the network, where $\varphi^{fr}_i$ is the time offset for the frame "fr", where $B^{fr}_i$ is the transmission duration for the frame "fr", and where $G_{int}$ is the guard interval.

To be scheduled consecutively denotes that the frames are scheduled without a gap or interruption between them.

Rule SO 6: A frame transmission gap constraint can be introduced between reception and transmission of a frame at a TSN bridge such that $$E\varphi^{fr}_i \geq \varphi^{fr}_{i-1} + B^{fr}_{i-1} + G_{int} + T_{Gap},$$

where $E\varphi^{fr}_i$ is the earliest available frame offset for frame "fr", where $\varphi^{fr}_{i-1}$ is the time offset for the frame on the link directly preceding link i, where $B^{fr}_{i-1}$ is the transmission duration for the frame on the link directly preceding link i, where $G_{int}$ is the guard interval, and where $T_{Gap}$ is the frame transmission gap.

The frame transmission gap can account for processing delays at non-ideal TSN bridges.

Rule SO 7: A 5G window starts as soon as the 5G system receives a TSN frame at its virtual ports (i.e., UE or the UPF), i.e., $$O_w \geq \varphi^{fr}_{i-1} + B^{fr}_{i-1}$$

where $O_w$ is the window offset of new window for link i (i.e., starting point for frame transmission), where $\varphi^{fr}_{i-1}$ is the time offset for the frame on the link directly preceding link i, and where $B^{fr}_{i-1}$ is the transmission duration for the frame on the link directly preceding link.

This feature ensures that the end-to-end latency requirements of systems and data streams can be met.

Reference Example

FIG. 16 illustrates an integrated TSN and 5G system where three end stations (ES1, ES2 and ES3) exchange three different control traffic flows (data streams) ($f_1$, $f_2$ and $f_3$). The payload, the cycle time, and the end-to-end delay requirement of each flow, along with its path/route is shown in the table. It is assumed that all flows have a similar end-to-end delay and jitter requirement.

FIG. 17 illustrates the schedule synthesized for the scenario of FIG. 16. The label is in the format FlowID-.QueueID, i.e., it indicates the flow ID and the ID of the assigned queue at the egress port.

Similar capabilities for all TSN bridges and a maximum transmission unit (MTU) of 1500 bytes are assumed. Hence, flows $f_1$, $f_2$, and $f_3$ require two, one, and three frame transmissions, respectively.

Based on the cycle times of the data streams ($f_1$, $f_2$ and $f_3$), the allocation window (hyper-period) $T_{HP}$ is determined to be 4 msec.

Flow $f_2$ takes priority for scheduling as it has more stringent cycle time requirements. Based on the cycle time and the cycle time of $f_2$, it can be determined that there are two cycles of $f_2$ that require frame scheduling.

Following the sequential scheduling approach, frame scheduling is performed for each link and for each cycle of $f_2$. Since no other frame is scheduled yet on the link [ES2, TSN1], the frame of $f_2$ is scheduled at offset 0, as per Rule SO 1, and assigned egress queue 1. A queue is assigned if there are no other frames from other data streams in the queue.

On the next link, i.e., [TSN1, 5G], the earliest available offset is determined based on the frame transmission order constraint and Rule SO 7. The frame is scheduled at offset O1.

Next, a 5G window is defined on the link [5G, TSN2] at time O2. The initial window size is determined based on end-to-end transmission time of the frame over the 5G system. Note that there is no queue assigned for the 5G system (i.e., 2.X where X does not indicate any queue) as the frame is handled based on internal protocols and procedures of the 5G system.

On the final link, [TSN2, ES3], the frame is scheduled at offset O3 as per Rule SO 3. The scheduling procedure is repeated for the second cycle of $f_2$.

Next, the scheduling for flow $f_1$ is described. This data stream requires two frame transmissions in one cycle, where the cycle is the same as the allocation window (hyper-period).

Note that ES1 cannot be scheduled until flow $f_2$'s frame has left the queue at TSN1. This is due to link transmission and frame isolation constraints. Therefore, on the link [ES1, TSN1], the frame is scheduled at offset O4.

On the link [5G, TSN2], the first frame of $f_1$ is allocated an existing 5G window (created for transmission of $f_2$'s frame). The window length is updated as per the 5G window optimization algorithm (see below).

On the final link [TSN2, ES3], the first frame of $f_1$ is scheduled for transmission after $f_2$'s frame. Note that the frame of $f_1$ is assigned a different queue at TSN2.

The second frame of $f_1$ can be scheduled consecutively or spread in the time domain as in this case (i.e., it is scheduled at offset O5). The significance of spreading frames is described later with relation to the scheduling of best-effort traffic. In this case the second frame of $f_1$ arrives earlier than the $f_2$'s frame in the next cycle. Therefore, a new 5G window is created which is also allocated to $f_2$'s frame later.

Next, the scheduling for flow $f_3$ is described. This data stream requires three frame transmissions in one cycle, where the cycle is the same as the allocation window (hyper-period). The three frames are scheduled consecutively on the first link [ES3, TSN2] with the first frame assigned offset O.

Scheduling on subsequent links follows a similar procedure as described for other flows. It is assumed that scheduling on link [TSN2, 5G] takes place as per Rule SO 6. Hence, the first frame is scheduled at offset O6.

Note that the 5G window allocated on the link [5G, TSN1] overlaps in time domain with the 5G window on link [5G, TSN2]. The 5G system transmits TSN traffic in both directions. There can be two separate TSN UEs (one for transmitting TSN traffic from UE-side ingress and the other for receiving TSN traffic from networks-side ingress) or a single UE with separate PDU sessions carrying end-to-end traffic between the UE and the UPF. The overlapping 5G windows can be further optimized, as described below.

5G Window Optimization Algorithm

FIG. 18 illustrates a 5G window optimization algorithm. Window optimization becomes possible due to information exchange between the 5G system and the CNC. The 5G system exchanges channel quality information of the TSN UEs periodically with the CNC. Moreover, information about 5G capabilities such as available bandwidth and supported QoS classes can be exchanged before schedule synthesis.

The objective of the 5G window optimization algorithm is to minimize the length of the 5G window such that the flow requirements are fulfilled. The algorithm is triggered every time a TSN frame transmission is required over a 5G link (system).

If an existing 5G window is not available for frame transmission (S1801), a new window is defined (S1802), i.e., a window offset is computed based on the scheduling opportunity. This is followed by computation of the minimum and maximum duration of the air-interface (UE to RAN) and core network (RAN to UPF) transmissions (S1804). The length of 5G window is dictated by the cumulative duration of air-interface and core network transmissions which are based on downlink (network-wide ingress) and uplink (UE-side ingress) channel conditions, and the QoS profile on the 5G system for handling TSN traffic.

It is assumed that the TSN UE is in a connected state (connected to the network) and it has a protocol data unit session (PDU) session established with the network for delivery of TSN traffic. The transmission time of a frame on the air-interface $T_{air}$ can be calculated as follows:

$$T_{air} = T_{wait} + T_{Txn}$$

where $T_{wait}$ is the waiting time for the next scheduling opportunity and $T_{Txn}$ is the actual transmission time on the air-interface. The waiting time for the next scheduling opportunity depends on the air-interface frame structure, i.e., the number of slots in a sub-frame and the number of control channels defined in a slot.

In the case of downlink scheduling (i.e., RAN to UE), the minimum waiting time is achieved when the frame arrives at the RAN (gNB) just before the next scheduling opportunity, i.e., it is equal to the processing time which is assumed to be a function of the symbol duration. The maximum waiting time is incurred if the frame arrives just after the scheduling opportunity and must wait for a slot duration. In the case of non-slot-based transmissions, the maximum waiting time depends on the duration of the number of symbols between two consecutive scheduling opportunities. In the case of uplink scheduling, additional delay for scheduling request messages must be accounted for.

The transmission time on the air-interface $T_{air}$ is dictated by the link-level channel conditions of the TSN UE, i.e., a UE is assigned an appropriate modulation and coding scheme based on the channel quality index. In some embodiments, the transmission time on the air-interface is calculated based on the average channel conditions of the TSN UE over a certain period. In other embodiments, the transmission time is calculated based on the mean of the maximum and minimum achievable data rate on the air-interface, which is dictated by the highest and lowest support modulation and coding schemes.

The latency incurred for core network transmission (i.e., between the RAN and the UPF) is based on the QoS profile and the capabilities of the transmission medium.

In some embodiments, the 5G window length for a frame is computed as the mean of the minimum and maximum possible window length (S1805), i.e., $$T_{window} = 0.5 \times (T^{min}_{wait} + T^{max}_{wait}) + 0.5 \times (T^{min}_{Txn} + T^{max}_{Txn}) + T_{core},$$

In other embodiments, the 5G window length is computed as the maximum possible window length (S1805).

If an existing 5G window is available (S1801), the (new) TSN frame is assigned to this window (S1803) and a window length update procedure is triggered. The window length update procedure (S1806) determines the additional duration for transmitting the new TSN frame. Note that multi-user and parallel transmissions are possible over the 5G system. Therefore, given an old window length of $T_{oldwindow}$, the new window length is given by $$T^{new}_{opt} = \max(T^{old}_{window}, T^{old}_{window} + O_w + T^{new}_{window})$$

where $O_w$ is the window offset of new window (i.e., starting point for frame transmission).

If no further frames need to be scheduled, the algorithm computes the optimized 5G window length (S1807) and terminates.

Note that merging of multiple 5G windows into a single window, spanning multiple links, for both UE-side ingress and network-side ingress is also possible.

GCL Computation

The GCL computation procedure calculates the gating events, i.e., gate open ($G_{open}$) and gate close ($G_{close}$) for each link in the integrated system. The GCL ensures that the gates are opened for each scheduled frame as per the following conditions.

For a TSN link, the conditions are:

$$G^{i,fr}_{open} = \varphi^{fr}_i, \forall i \in \mathcal{N}_{TSN}$$

$$G^{i}_{close} = \varphi^{fr}_i + B^{fr}_i, \forall i \in \mathcal{N}_{TSN}$$

where $G^{i,fr}_{open}$ is the gate open command for the frame fr on the link i, where $\varphi^{fr}_i$ is the time offset for the frame "fr", where $\mathcal{N}_{TSN}$ is the set of TSN links in the network, where $G^i_{close}$ is the gate close command for the frame fr on the link l, and where $B^{fr}_i$ is the transmission duration for the frame "fr".

Therefore, the GCL for a TSN link i is given by [$\{G^{i,1}_{open}, G^{i,1}_{close}\}, \{G^{i,2}_{open}, G^{i,2}_{close}\}, \ldots, \{G^{i,last}_{open}, G^{i,last}_{close}\}$].

For 5G links, the GCL only dictates the start (i.e., $O_w$) and end (i.e., $Ow + T^{new}_{opt}$) of a 5G window. The TSN traffic inside a 5G system is handled by its internal protocols and procedures.

Schedule for Best-Effort Traffic

In some embodiments, the described systems and methods provide a schedule for best-effort traffic (flows) based on the synthesized schedule for control traffic (flows). This is achieved through a schedule interleave procedure.

Rule SO 8: On each link, a scheduling opportunity for best-effort traffic arises if there is a transmission gap of at least two frame transmissions between two scheduled control traffic frames, i.e., $$\varphi^{fr,2} - (\varphi^{fr,1} + B^{fr,1} + G^{int}) \geq 2 \times B^{fr,1}.$$

where $\varphi^{fr,2}$ is the time offset for the frame "fr,2", where $\varphi^{fr,1}$ is the time offset for the frame "fr,1", where $B^{fr,1}$ is the transmission duration for the frame "fr,1", and where $G_{int}$ is the guard interval.

The frame offset for a best-effort frame transmission is defined such that the gate closes with at least one frame transmission duration to go. This is to avoid interference with frame transmission of control flows.

To illustrate the schedule for best-effort traffic, we consider a similar network configuration as in FIG. 15; however, with a best effort flow fa with route [ES1, TSN1, 5G, TSN2, ES3]. With the proposed schedule interleave procedure, the resulting schedule for control traffic flows $f_1$-$f_3$ and best-effort traffic flow fa is shown in FIG. 19.

The best-effort frame of flow fa is scheduled on each link as per the rules described previously. On the link [ES1, TSN1], the frame is scheduled between the two frame transmissions of flow $f_1$. On link [TSN1, 5G], the frame is also scheduled between the two frame transmissions of flow $f_1$. On the link [5G, TSN2], the first frame of fa is allocated an existing 5G window (created for transmission of $f_2$'s frame). The window length is updated as per the 5G window optimization algorithm (see below).

On the final link [TSN2, ES3], the first frame of fa is scheduled for transmission between the two frame transmissions of flow $f_1$. Note that the frame of fa is assigned a different queue at TSN2.

The distinguishing aspects of the disclosed methods and systems are described as follows.

System-level Scheduling: Conventional scheduling frameworks in 5G systems are largely focused on allocation of wireless resources. On the other hand, existing TSN scheduling frameworks use computationally intensive compositional system designs for deriving 802.1Qbv-compatible schedules. The disclosed methods and systems provide a system-level (cross-technology) scheduling framework which provides a low-complexity and end-to-end schedule for converged operation of 5G and TSN systems.

Joint Optimization of 5G and TSN Systems: The disclosed methods and systems jointly optimize 5G and TSN systems for control and best-effort traffic flows while considering system-level, 5G-centric, and TSN-centric constraints that dictate a feasible solution space for global scheduling. Joint optimization is further achieved through scheduling of individual frames of a flow and allocation of windows for transmission over 5G systems while considering capabilities of TSN bridges and 5G systems.

The disclosed methods and systems provide a low-complexity heuristic solution for system-level scheduling in integrated 5G and TSN systems. Some additional advantages are highlighted as follows.

- The disclosed methods and systems can be directly applied to scheduling in TSN-only deployments.
- Hybrid flow-based and window-based scheduling in the disclosed methods and systems natively minimize jitter for control flows.
- The disclosed methods and systems support scheduling of multiple TSN domains over a 5G system.
- The disclosed methods and systems can be easily extended for multicast communication.
- The disclosed methods and systems are aligned with O-RAN framework for 5G systems.

While certain arrangements have been described, the arrangements have been presented by way of example only, and are not intended to limit the scope of protection. The inventive concepts described herein may be implemented in a variety of other forms. In addition, various omissions, substitutions and changes to the specific implementations described herein may be made without departing from the scope of protection defined in the following claims.

The invention claimed is:

1. A method of scheduling and transmitting frames of a first data stream in a composite network, wherein the composite network comprises a plurality of nodes, the nodes comprising at least one time-sensitive network (TSN) comprising at least one time-sensitive network (TSN) bridge, and at least one wireless 5G network comprising an air interface and a core network, the first data stream associated with a route from a first node of the plurality of nodes to a second node of the plurality of nodes, the route comprising at least one link, the link being either a wireless 5G link or a TSN link, the method comprising:

determining, for the composite network, an allocation window based on a cycle time of the first data stream, wherein the allocation window defines a period during which at least one cycle of each data stream in the composite network is completed, wherein a cycle is a fixed length time window;

determining a number of cycles for the first data stream based on the allocation window and the cycle time of the first data stream in the composite network;

determining a number of frame transmissions for each cycle of the first data stream based on a payload of the first data stream and a maximum transmission unit (MTU) of the composite network;

scheduling the frame transmissions for each cycle of the first data stream sequentially on each link along the route and within the allocation window; and for each link, allocating a TSN slot or a wireless 5G window for each frame transmission based on a type of the link, wherein scheduling the frame transmissions for the first data stream sequentially on each link is based on a set of constraints, wherein the set of constraints comprise at least one of a constraint of the wireless 5G network, a constraint of the TSN network, a topology of the composite network, a requirement of the first data stream or a scheduling constraint.

2. The method of claim 1, wherein scheduling the frame transmissions for the first data stream sequentially on each link comprises:

wherein the link is a TSN link, for each frame transmission, determining an earliest available frame offset on the link which fulfils a set of constraints, wherein the set of constraints comprise a constraint of the wireless 5G network, a constraint of the TSN network, a topology of the composite network, a requirement of the first data stream and/or a scheduling constraint; and scheduling the frame transmission on the link at the earliest available frame offset.

3. The method of claim 1, wherein determining the allocation window comprises:

determining the allocation window based on the cycle time of the first data stream and a cycle time of a second data stream, wherein frames of the second data stream are to be transmitted over the composite network.

4. The method of claim 1, wherein the route comprises a TSN link, the method further comprising:

creating a gate control list for controlling the transmission of the frame transmissions on the TSN link based on the scheduling of the frame transmissions for each cycle of the first data stream.

5. The method of claim 1, wherein frames of a second data stream are to be transmitted over the composite network, the method further comprising:

prioritising the first data stream based on the cycle time of the first data stream and a cycle time of the second data stream.

6. The method of claim 1, wherein scheduling the frame transmissions for the first data stream sequentially on each link comprises:

for each frame transmission on a link of the route, wherein the link is a TSN link, wherein the frame transmission is a first transmission of the first data stream to be scheduled on the link, schedule the frame transmission based on a number of available slots on the link, a link transmission constraint and a frame isolation constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge.

7. The method of claim 1, wherein scheduling the frame transmissions for the first data stream sequentially on each link comprises:

for each frame transmission on a link of the route, wherein the link is a TSN link, wherein the frame transmission is not a first transmission of the first data stream to be scheduled on the link, schedule the frame transmission based on a number of available slots on the link, a frame isolation constraint, a frame transmission order constraint, and a link transmission constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge, wherein the frame transmission order constraint specifies that each frame in the network can only be transmitted over a link after it has been completely received over a link directly previous.

8. The method of claim 1, wherein scheduling the frame transmissions for the first data stream sequentially on each link comprises:

for each frame transmission on a link of the route, wherein the link is a TSN link immediately following a 5G link, wherein the TSN link is from a TSN network that receives frames from a 5G network, schedule the frame transmission based on the number of available slots on the link, an end-to-end transmission time of a frame over the 5G system, the frame isolation constraint, the frame transmission order constraint, and the link transmission constraint, wherein the link transmission constraint ensures that no two frame transmissions transmitted through the link overlap in time, wherein the frame isolation constraint ensures that the frame transmission of the first data stream cannot arrive at the TSN bridge if a frame transmission from a second data stream is in a queue at the TSN bridge, wherein the frame transmission order constraint specifies that each frame in the network can only be transmitted over a link after it has been completely received over a link directly previous.

9. The method of claim 1, wherein scheduling the frame transmissions for the first data stream sequentially on each link comprises:

for each frame transmission on a link of the route, wherein the link is a wireless 5G link, schedule the frame transmission based on a frame transmission order constraint and a radio resource allocation constraint, wherein the frame transmission order constraint specifies that each frame in the network can only be transmitted over a link after it has been completely received over a link directly previous, wherein the radio resource allocation constraint specifies that the frame transmission is allocated sufficient radio resources for transmission on an air-interface.

10. The method of claim 1, wherein scheduling the frame transmissions for the first data stream sequentially on each link comprises:

scheduling multiple frame transmissions of the first data stream consecutively within the cycle.

11. The method of claim 1, wherein scheduling the frame transmissions for the first data stream sequentially on each link comprises:

introducing a frame transmission gap between reception and transmission of a frame at a TSN bridge.

12. The method of claim 1, wherein scheduling the frame transmissions for the first data stream sequentially on each link comprises:

when the wireless 5G network receives a frame transmission, starting a wireless 5G window immediately.

13. The method of claim 1, wherein scheduling the frame transmissions for the first data stream sequentially on each link comprises;

wherein the link is a wireless 5G link, wherein an existing wireless 5G window is not available for frame transmission, define a new wireless 5G window;

determine a maximum transmission time on the air-interface and the core network of the wireless 5G network; and calculate a length of the window for frame transmission based on the maximum transmission time.

14. The method of claim 1, wherein scheduling the frame transmissions for the first data stream sequentially on each link comprises;

if the link is a wireless 5G link, if an existing wireless 5G window is available for frame transmission allocate the frame transmission to the existing wireless 5G window; and update the length of the window based on an additional time for transmitting the frame transmission.

15. The method of claim 1, wherein there is a transmission gap between two scheduled frame transmissions on a TSN link, wherein the transmission gap is at least twice a size of a frame transmission on the TSN link, the method further comprising:

scheduling a best-effort frame transmission between the two scheduled frame transmissions on the TSN link.

16. A system for scheduling and transmitting frames of a first data stream in a composite network, wherein the composite network comprises a plurality of nodes, the first data stream associated with a route from a first node of the plurality of nodes to a second node of the plurality of nodes, the route comprising at least one link, the link being either a wireless 5G link or a TSN link, the system comprising:

a time-sensitive network (TSN) comprising at least one time-sensitive network (TSN) bridge;

a wireless 5G network comprising an air interface and a core network, the system configured to:

determine an allocation window based on a cycle time of the first data stream, wherein the allocation window defines a period during which at least one cycle of each data stream in the network is completed, wherein a cycle is a fixed length time window;

determine a number of cycles for the first stream based on the allocation window and the cycle time of the first data stream;

determine a number of frame transmissions for each cycle of the first data stream based on a payload of the first data stream and a maximum transmission unit (MTU) of the composite network;
schedule the frame transmissions for each cycle of the first data stream sequentially on each link along the route and within the allocation window; and
for each link, allocate a TSN slot or a wireless 5G window for each frame transmission based on a type of the link,
wherein scheduling the frame transmissions for the first data stream sequentially on each link is based on a set of constraints, wherein the set of constraints comprise at least one of a constraint of the wireless 5G network, a constraint of the TSN network, a topology of the composite network, a requirement of the first data stream or a scheduling constraint.

* * * * *